(12) United States Patent
Yamamoto

(10) Patent No.: US 11,620,896 B1
(45) Date of Patent: Apr. 4, 2023

(54) LOCATION INFORMATION SHARING CONTROL SYSTEM AND LOCATION INFORMATION SHARING CONTROL DEVICE

(71) Applicant: OTTA INC., Fukuoka (JP)

(72) Inventor: Fumikazu Yamamoto, Fukuoka (JP)

(73) Assignee: OTTA INC., Fukuoka (JP)

( * ) Notice: Subject to any disclaimer, the term of this patent is extended or adjusted under 35 U.S.C. 154(b) by 0 days.

(21) Appl. No.: 17/800,474

(22) PCT Filed: Jan. 15, 2021

(86) PCT No.: PCT/JP2021/001221
§ 371 (c)(1),
(2) Date: Aug. 17, 2022

(87) PCT Pub. No.: WO2021/166507
PCT Pub. Date: Aug. 26, 2021

(30) Foreign Application Priority Data

Feb. 20, 2020 (JP) .............................. JP2020-027502

(51) Int. Cl.
*G08B 25/10* (2006.01)
*H04W 4/80* (2018.01)
(Continued)

(52) U.S. Cl.
CPC .............. *G08B 25/10* (2013.01); *H04W 4/02* (2013.01); *H04W 4/80* (2018.02)

(58) Field of Classification Search
CPC .................................................... G08B 25/10
See application file for complete search history.

(56) References Cited

U.S. PATENT DOCUMENTS 10,419,907 B2 * 9/2019 Redding ................ H04W 4/80
2018/0103030 A1 * 4/2018 Einberg .................. G06F 1/163
(Continued)

FOREIGN PATENT DOCUMENTS

EP          3142090 A1     3/2017
JP      2002-051373 A     2/2002
(Continued)

*Primary Examiner* — Joseph H Feild
*Assistant Examiner* — Pameshanand Mahase
(74) *Attorney, Agent, or Firm* — Young Basile Hanlon & MacFarlane, P.C.

(57) ABSTRACT

A location information sharing control system enables detection of a location of an object person with precision while suppressing power consumption of a terminal carried by the object person, and enables a related person other than a specific manager to grasp the location of an object person. An object person terminal transmits identification information via short-range wireless communication. A detection terminal transmits the identification information transmitted from the object person terminal to the server. The server, on the basis of information transmitted from the detection terminal, specifies the location of the object person terminal, and manages the information on a location information sharing user who shares the information on the location of the object person terminal, and shares the information on the location of the object person terminal with the location information sharing user set to be able to share the information on the location of the object person terminal.

12 Claims, 8 Drawing Sheets

(51) Int. Cl.
*H04W 4/02* (2018.01)
*H04W 4/21* (2018.01)
*H04W 4/23* (2018.01)

(56) References Cited

U.S. PATENT DOCUMENTS

2019/0213860 A1\* 7/2019 Shaprio ................. H04W 4/029
2020/0092690 A1\* 3/2020 Burchetta ............. H04W 4/023

FOREIGN PATENT DOCUMENTS

| JP | 5891468 B1 | 3/2016 |
| JP | 2019-040575 A | 3/2019 |
| WO | 2015/170538 A1 | 11/2015 |

\* cited by examiner

50

| No. | OBJECT PERSON (OBJECT PERSON TERMINAL) | MANAGER (MANAGER TERMINAL) | SHARING PERSON (SHARING PERSON TERMINAL) | SHARING CONDITION |
|---|---|---|---|---|
| 1 | 001 (10a) | A (40a) | X (50a) | TUESDAY 18:30 - 21:30 |
|   |   |   | Y (50b) | WEEKDAYS 8:30 - 17:00 |
| 2 | 002 (10b) | A (40a) | Y (50b) | WEEKDAYS 8:30 - 15:00 |
|   |   |   | Z (50c) | WEDNESDAY 17:30 - 20:30 |
| 3 | 003 (10c) | B (40b) | P (50d) | MEETING TIME OF TOUR ± 30 MIN RANGE OF 50 M FROM TOUR BUS |
| 4 | 004 (10d) | C (40c) | Q (50e) | AT WORK EMERGENCY OCCURRENCE |
| ... | ... | ... | ... | ... |

LOCATION INFORMATION SHARING CONTROL SYSTEM AND LOCATION INFORMATION SHARING CONTROL DEVICE

CROSS-REFERENCE TO RELATED APPLICATION(S)

This application claims priority to and the benefit of Japanese Patent Application Ser. No. 2020-027502, filed Feb. 20, 2020, the entire disclosure of which is hereby incorporated by reference.

TECHNICAL FIELD

The present invention relates to a location information sharing control system and a location information sharing control device that enable a related person other than a specific manager to appropriately grasp a location of an object person to be watched such as a child as necessary.

BACKGROUND

For example, a guardian having a small child often has concerns about whether the child has arrived safely to school or a cram school without having an accident or the like, and will come home safely at the time of coming home. For this reason, conventionally, various efforts have been made to ensure the safety of children, such as observing school routes, in cooperation with local residents or the like, for example. However, due to a change in the social environment such as an increase in the number of double-income households and an aging population, or the like, it is difficult to provide sufficient watching. Under such circumstances, cases in which a child is taken away on the way to or from school or involved in an incident continue, and rather increase.

As a mechanism for taking measures against the above problem, for example, a service is provided that enables ascertaining of location information of a child using a GPS function mounted on a portable information terminal such as a smartphone or the like.

However, in a portable information terminal such as a smartphone or the like, a terminal price, a communication fee, and the like are generally high, and it is considered that restriction of use due to educational reasons and the like is also necessary, and thus it is not realistic to cause each child to have a portable information terminal for the purpose of ascertaining location information.

In addition, location detection by the GPS function has the problem that accuracy of a detected location is not sufficiently high. For example, the problem occurs that although a child is actually at school, the child is detected as being on a road outside the school, or the like, and a guardian or the like who has ascertained the location of the child becomes anxious or feels uncomfortable.

Furthermore, since the GPS function consumes a large amount of power, it is necessary to charge the smartphone or the like at least every several days when the GPS function is constantly used to detect a location. In this case, for example, if a user forgets charging, the user fails to ascertain the location of the child in an emergency.

In order to take measures against such a problem, a technique has also been developed that uses power-saving short-range wireless communication such as Bluetooth or the like without using the GPS function. For example, a child is caused to carry a simple Bluetooth terminal that transmits only identification information, and the identification information transmitted from the Bluetooth terminal is read by a reading terminal located in a watching area such as a school route or the like. As a result, it is possible to ascertain that the child has passed the location of the reading terminal (see, for example, JP 5891468B2).

By such a method, since short-range wireless communication is used, accuracy of location detection is high, and since the GPS function is not used, it is not necessary to frequently charge a terminal carried by a child.

SUMMARY

In the location detection technology as described above, for example, a specific manager such as a parent who subscribes to a location detection service and causes their child to possess a terminal can grasp the location of the child. However, a school related person who receives and manages a child in the daytime or a person related to a cram school or a lesson that receives and manages a child at night or on a holiday or the like is not able to grasp the location of the child. For this reason, for example, in a case where some abnormality occurs to a child on the way to a cram school and the child does not arrive at the cram school as scheduled, there is a problem in that a related person related to the cram school is not able to immediately grasp the location of the child and is not able to lead to a quick response.

The present invention is made in view of the above circumstances. That is, an object of the present invention is to provide a location information sharing control system and a location information sharing control device that enable detection of a location of an object person with good precision while suppressing power consumption of a terminal carried by the object person, and enable a related person other than a specific manager to appropriately grasp the location of an object person as necessary.

The above object is achieved by the following means.

A location information sharing control system includes: an object person terminal carried by an object person; a detection terminal that is present in a region including a watching area of the object person set in advance, and detects the object person terminal with which communication is possible via short-range wireless communication; and a server that registers information transmitted from the object person terminal and the detection terminal. The object person terminal includes a short-range communication unit that transmits identification information for identifying the object person terminal via short-range wireless communication. The detection terminal includes a detection unit and a transmission unit. The detection unit detects the object person terminal with which communication is possible. The transmission unit, when the object person terminal is detected by the detection unit, acquires the identification information transmitted from the short-range communication unit and transmits the identification information to the server. The server includes an acquisition unit, a specification unit, a management unit, and a sharing unit. The acquisition unit acquires the identification information transmitted from the detection terminal and information on the location of the detection terminal. The specification unit specifies the location of the object person terminal on the basis of the identification information and the information on the location of the detection terminal acquired by the acquisition unit. The management unit manages information on a location information sharing user who shares information on the location of the object person terminal. The sharing unit shares the information on the location of the object person terminal with the location information sharing user set to be able to share the information on the location of the object person terminal in the management unit.

A location information sharing control device is applied to the location information sharing control system that includes: an object person terminal carried by an object person; a detection terminal that is present in a region including a watching area of the object person set in advance, and detects the object person terminal with which communication is possible via short-range wireless communication; and a location information sharing control device that manages information transmitted from the object person terminal or the detection terminal. The location information sharing control device includes a specification unit, a management unit, and a sharing unit. The specification unit acquires the identification information for identifying the object person terminal transmitted from the detection terminal and the information on the location of the detection terminal, or the identification information and the location information of the object person terminal transmitted from the object person terminal, and specifies the location of the object person terminal. The management unit manages information on a location information sharing user who shares information on the location of the object person terminal. The sharing unit shares the information on the location of the object person terminal with the location information sharing user set to be able to share the information on the location of the object person terminal in the management unit.

The location information sharing control system according to the present invention includes the object person terminal, the detection terminal, and the server. The object person terminal transmits identification information for identifying the object person terminal via the short-range wireless communication. The detection terminal detects the object person terminal with which communication is possible, and acquires the identification information transmitted from the object person terminal when the object person terminal is detected, and transmits the identification information to the server. The server acquires the identification information transmitted from the detection terminal and information on a location of the detection terminal, and specifies a location of the object person terminal on the basis of the identification information and the information on the location of the detection terminal that are acquired. The server manages the information on the location information sharing user who shares the information on the location of the object person terminal, and shares the information on the location of the object person terminal with the location information sharing user set to be able to share the information on the location of the object person terminal in the management unit.

This enables detection of a location of an object person with good precision while suppressing power consumption of a terminal carried by the object person, and enables a related person related to the object person and other than a specific manager to appropriately grasp the location of the object person as necessary. Therefore, an appropriate related person can accurately and reliably grasp the location of the object person according to various situations in the life of the object person, and it is possible to construct a more secure and safe watching environment.

DETAILED DESCRIPTION

Figure 1:
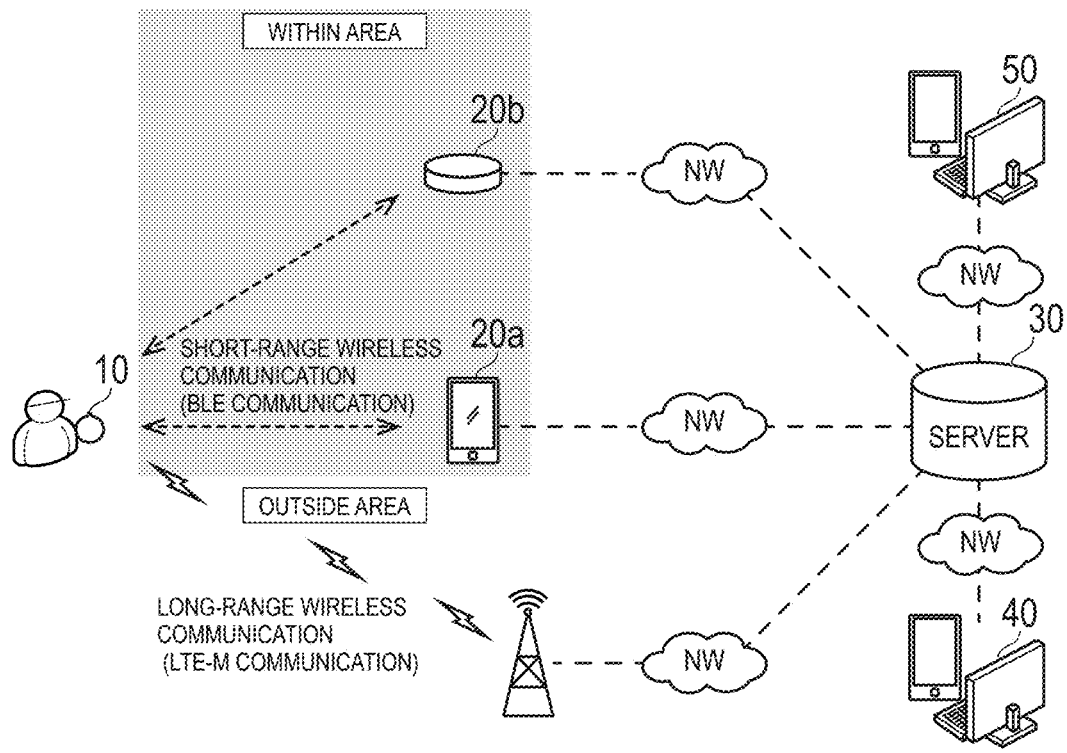
FIG. 1 is a diagram illustrating a schematic configuration of a location information sharing control system according to an embodiment of the present invention.

Hereinafter, an embodiment of the present invention will be described with reference to the accompanying drawings. In the description of the drawings, the same elements are denoted by the same reference numerals, and redundant description will be omitted. In addition, dimensional ratios in the drawings are exaggerated for convenience of description, and may be different from actual ratios.

<Configuration of Location Information Sharing Control System>

FIG. 1 is a diagram illustrating a schematic configuration of the location information sharing control system according to an embodiment of the present invention.

As illustrated in FIG. 1, the location information sharing control system includes an object person terminal 10, a detection terminal 20 (20a, 20b), a server 30, and a manager terminal 40, and a sharing person terminal 50. Hereinafter, the detection terminal 20a and the detection terminal 20b are, when not particularly distinguished, collectively referred to as the detection terminal 20.

The object person terminal 10 communicates with the detection terminal 20 (20a, 20b) via short-range wireless communication, and is connected to the server 30 through a network via long-range wireless communication.

The detection terminal 20 (20a, 20b) communicates with the object person terminal 10 via the short-range wireless communication, and is connected to the server 30 through the network via wired or wireless communication.

The server 30 is configured to be able to communicate with the object person terminal 10, the detection terminal 20

(20a, 20b), the manager terminal 40, and the sharing person terminal 50 through the network.

The manager terminal 40 and the sharing person terminal 50 are connected to the server 30 through the network via the wired or wireless communication. Hereinafter, each configuration will be described in detail.

<Object Person Terminal 10>

The object person terminal 10 is a terminal carried by an object person to be watched (hereinafter, also simply referred to as an "object person") such as a child, an elderly person, or the like.

Figure 2:
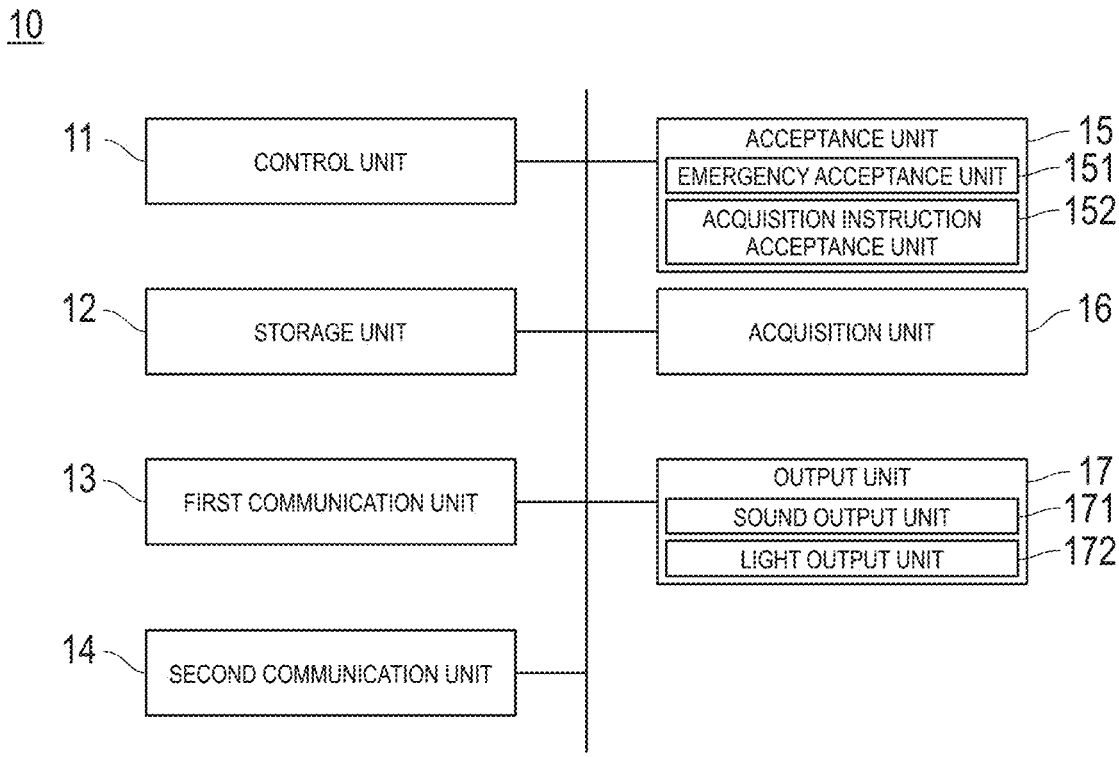
FIG. 2 is a block diagram illustrating a schematic configuration of an object person terminal.

FIG. 2 is a block diagram illustrating a schematic configuration of the object person terminal.

As illustrated in FIG. 2, the object person terminal 10 includes a control unit 11, a storage unit 12, a first communication unit 13, a second communication unit 14, an acceptance unit 15, and an acquisition unit 16. The components are connected one another through a bus in a mutually communicable manner.

The control unit 11 includes a CPU (Central Processing Unit), and executes, according to a program, control of each component described above and various types of arithmetic processing.

The storage unit 12 includes a ROM (Read Only Memory) that stores various programs and various types of data in advance and a RAM (Random Access Memory) that temporarily stores programs and data as a work region, and stores various programs and various types of data.

In addition, the storage unit 12 stores identification information for identifying the object person terminal 10, information indicating a first time interval that is a time interval at which the first communication unit 13 sends the identification information and a second time interval that is a time interval at which the second communication unit 14 performs communication, and the like. Furthermore, the storage unit 12 stores various types of information acquired by the acquisition unit 16.

The first communication unit 13 outputs a signal for performing short-range wireless communication using, for example, the Bluetooth (registered trademark) standard, and communicates with another terminal, device, or the like existing in proximity via the short-range wireless communication. As a standard of short-range wireless communication, for example, Bluetooth 4.0 (also referred to as Bluetooth Low Energy or BLE) is used. This standard is suitably used in the present embodiment because it achieves significant power saving instead of not pursuing a communication speed. The first communication unit 13 performs the short-range wireless communication at a first time interval that is a relatively short time interval of about several tens of milliseconds to several seconds, for example, and sends the identification information for identifying the object person terminal 10 to the surroundings. The first time interval can be set to, for example, about 3 seconds. In the present embodiment, the first communication unit 13 functions as a short-range communication unit.

The second communication unit 14 communicates with other terminals, devices, and the like via long-range wireless communication provided by a mobile communication carrier or the like. As a standard of long-range wireless communication, for example, LTE-M (Long Term Evolution for Machine-type-communication) is used. This standard is one of LPWA (Low Power Wide Area: wireless communication techniques that enable power saving and wide-area communication) utilizing existing LTE equipment, and is suitably used in the present embodiment because power saving and improvement of communication stability are achieved while a moderate communication speed is secured. In the present embodiment, the second communication unit 14 transmits the identification information for identifying the object person terminal 10 to the server 30 at a second time interval that is a relatively long time interval of, for example, several minutes to several hours. The second time interval can be optionally set by the user, and for example, may be selected and set by the user from among selection candidates such as 5 minutes, 10 minutes, 30 minutes, 1 hour, 2 hours, 12 hours, and the like. In addition, the second time interval may be set such that different values are used in a case where the object person terminal 10 is moving and a case where the object person terminal 10 is stationary. For example, the second time interval during movement when the object person terminal 10 is moving may be set to 30 minutes, and the second time interval during stationary when the object person terminal 10 is stationary may be set to 1 hour. Here, whether the object person terminal 10 is moving or stationary can be determined, for example, on the basis of detection information of an acceleration sensor (not illustrated) provided in the object person terminal 10. Furthermore, the second time interval may be set to a different value corresponding to the stage of the moving speed of the object person terminal 10. For example, different values may be set to be used correspondingly to the stages of the moving speed, such as when the moving speed of the object person terminal 10 is low (0 km/h to 4 km/h), medium (4 km/h to 10 km/h), high (10 km/h or higher), and the like. The stages of the moving speed are not limited to the above example, and various numbers and ranges of stages can be set.

In addition, the second communication unit 14 has a GPS function of receiving a signal from a GPS satellite and acquiring location information on the basis of the received signal. The second communication unit 14, when transmitting the identification information for identifying the object person terminal 10 to the server 30 as described above, activates the GPS function to acquire the location information, and transmits the acquired location information to the server 30 together with the identification information. As described above, in addition to using the long-range wireless communication technology by which power saving is achieved, the second communication unit 14 performs the long-range wireless communication and the location information acquisition by the GPS function at relatively long time intervals of about 1 hour and thus, further power saving is provided. In the present embodiment, the second communication unit 14 functions as a long-range communication unit.

The configuration of the acceptance unit 15 is a configuration to accept an instruction from an object person or the like, and includes, for example, a push button, a button on a touch panel, and the like. In the present embodiment, the acceptance unit 15 includes an emergency acceptance unit 151 for accepting an instruction regarding the occurrence of a matter of emergency, and an acquisition instruction acceptance unit 152 for accepting an instruction for acquiring sound information for distribution from the server 30. When the emergency acceptance unit 151 accepts an instruction regarding the occurrence of a matter of emergency, the control unit 11 senses the occurrence of a matter of emergency as the sensing unit. Note that the control unit 11 may sense the occurrence of a matter of emergency when an abnormal motion such as falling or a sudden speed change of the object person, or the like is detected on the basis of outputs of various sensors (not illustrated) such as the acceleration sensor or the like provided in the object person terminal 10 for detecting a motion of the object person terminal 10. In addition, the control unit 11 may sense the occurrence of a matter of emergency when having acquired an emergency flag to be described later from the server 30. Note that the acceptance unit 15 may accept an instruction via a sound acquired by a microphone or the like, or may accept an instruction via an image (including video) acquired by a camera or the like. Furthermore, the emergency acceptance unit 151 and the acquisition instruction acceptance unit 152 of the acceptance unit 15 may be mounted in association with respective buttons, or may be mounted in association with respective operation methods such as short pressing, long pressing, and continuous pressing, or the like of one button. Furthermore, a timing at which the emergency acceptance unit 151 is used is not limited to a timing at which a matter of emergency occurs, and may be used at any timing desired by the object person.

The configuration of the acquisition unit 16 is a configuration for acquiring ambient sounds and images (video) around the object person terminal 10, and includes a microphone, a camera, and the like. The acquisition unit 16 functions as a recording unit in the present embodiment. The acquisition unit 16 acquires ambient sounds or images (video) when the emergency acceptance unit 151 accepts an instruction regarding the occurrence of a matter of emergency, for example. For example, the acquisition unit 16 may repeatedly record ambient sounds or images (video) at a predetermined interval after the occurrence of a matter of emergency is sensed. As a result, it is possible to effectively grasp the state of the object person and the surrounding state while suppressing the power consumption. The control unit 11 stores information indicating sounds or images (video) acquired by the acquisition unit 16 in the storage unit 12 and transmits the information to the server 30 via the second communication unit 14. Furthermore, the control unit 11 controls the second communication unit 14 to acquire the location information by the GPS function, and transmits a notification indicating the occurrence of a matter of emergency to the server 30 together with the identification information and the location information of the object person terminal 10.

The output unit 17 includes a sound output unit 171 that outputs sound and a light output unit 172 that outputs light. The sound output unit 171 is a sound output interface such as a speaker, an earphone jack, or the like and the light output unit 172 is a light source such as an LED or the like. The sound output unit 171 or the light output unit 172 notifies the object person by sound or light that the distribution sound information is received in the server 30. In this case, the output unit 17 also functions as the object person notifying unit. As a result, when a notification by sound or light by the output unit 17 is ascertained, the user can reliably and easily acquire the distribution sound information stored in the server 30 and listen to the sound simply by operating the acquisition instruction acceptance unit 152. Note that the light output unit 172 may be provided on the acquisition instruction acceptance unit 152. As a result, when the light output unit 172 on the acquisition instruction acceptance unit 152 is emitting light, the user may operate the acquisition instruction acceptance unit 152, and can more reliably and easily acquire the distribution sound information stored in the server 30 and listen to the sound. Furthermore, the output unit 17, as an image output unit, may include a video output interface such as a display, a video output terminal, or the like, and execute various notifications by an image (video).

Since the object person terminal 10 in the present embodiment achieves power saving as described above with respect to wireless communication, the power consumption of which is normally high, when using a small secondary battery such as a rechargeable lithium ion battery, or the like, for example, the object person terminal 10 can operate without being charged for about one month, and can operate, depending on the setting content and the use situation, for about several months to one year without being charged.

<Detection Terminal 20 (20*a*, 20*b*)>

The detection terminal 20 is a terminal that is present in a region including the watching area of the object person and detects the object person terminal 10 with which communication is possible via the short-range wireless communication. The detection terminal 20*a* is a fixed terminal installed at a predetermined location included in the watching area, and the detection terminal 20*b* is a mobile terminal provided on a person, a vehicle, or the like that is a mobile body moving in a region including the watching area. Examples of the above vehicle include various vehicles such as a private car, a taxi, a bus, and a train, and the like. For example, the detection terminal 20 may be configured by installing a dedicated application in a general-purpose information terminal such as a smartphone, a tablet PC, or the like or may be configured as a dedicated terminal having a minimum configuration as described below.

Figure 3:
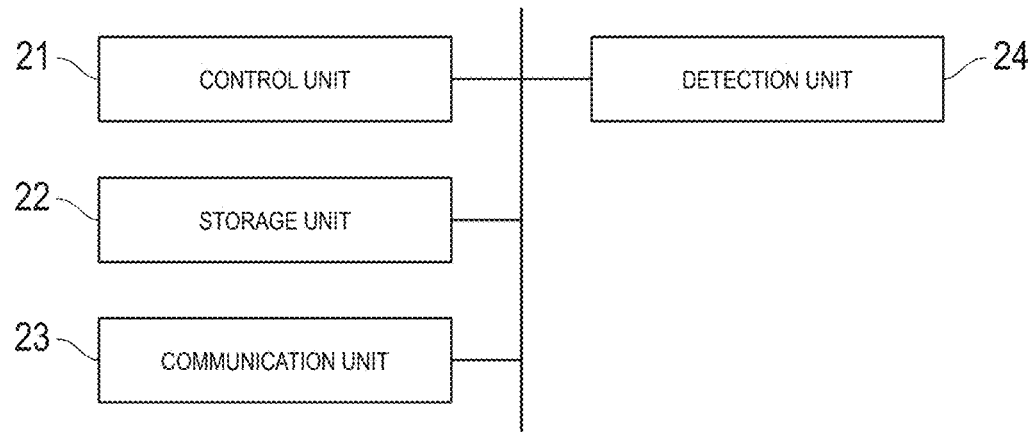
FIG. 3 is a block diagram illustrating a schematic configuration of a detection terminal.

FIG. 3 is a block diagram illustrating a schematic configuration of the detection terminal.

As illustrated in FIG. 3, the detection terminal 20 includes a control unit 21, a storage unit 22, a communication unit 23, and a detection unit 24. The components are connected one another through a bus in a mutually communicable manner. Since the configurations of the control unit 21 and the storage unit 22 of the detection terminal 20 are the same as those of the control unit 11 and the storage unit 12 of the object person terminal 10, respectively, the description of the configurations will be omitted.

The configuration of the communication unit 23 is a configuration for communicating with other terminals, devices, and the like via a network. The communication unit 23 transmits and receives various types of information to and from the server 30, for example.

The configuration of the detection unit 24 is a configuration to detect the object person terminal 10 with which communication is possible via the above-described short-range wireless communication such as Bluetooth, or the like. As described above, the object person terminal 10 performs communication via the short-range wireless communication by the first communication unit 13. For example, when receiving the identification information sent by the first communication unit 13 of the object person terminal 10, the detection unit 24 can detect the object person terminal 10 as an object person terminal 10 with which communication is possible.

When the detection unit 24 detects the object person terminal 10, the control unit 21, as a transmission unit, transmits the identification information of the object person terminal 10 to the server 30.

Since the detection terminal 20*a* is a fixed terminal, the information on the location of each detection terminal 20*a* is stored in advance in the storage unit 32 of the server 30 in association with the information for identifying the detection terminal 20*a*. When the identification information of the object person terminal 10 detected by the detection unit 24 is transmitted to the server 30, the detection terminal 20*a* transmits together information for identifying the detection terminal 20*a* to the server 30. As a result, the server 30 can use the information for identifying the detection terminal 20*a* received together when receiving the identification information of the object person terminal 10 from the detection terminal 20a, to acquire the information on the location of the detection terminal 20a from the storage unit 32.

On the other hand, since the detection terminal 20b is a mobile terminal, the information on the location of each detection terminal 20b is acquired by the GPS function included in the corresponding detection terminal 20b on the basis of a signal from the GPS satellite. When the identification information of the object person terminal 10 detected by the detection unit 24 is transmitted to the server 30, the detection terminal 20b transmits together information indicating the location of the detection terminal 20b. As a result, the server 30 can acquire the information indicating the location of the detection terminal 20b on the basis of the information received together when receiving the identification information of the object person terminal 10 from the detection terminal 20b.

For example, when the detection terminal 20b, which is a mobile terminal, is configured by a smartphone, a tablet PC, or the like, the detection terminal has a configuration of a general information terminal further including an operation unit or a display unit (such as a touch panel display or the like). In this case, the detection terminal 20 can also be used as the manager terminal 40 or the sharing person terminal 50 to be described later.

<Server 30>

The server 30 is an information processing device, for example, operated by a provider of a service that specifies and notifies location information. In the present embodiment, the server 30 functions as the location information sharing control device.

Figure 4:
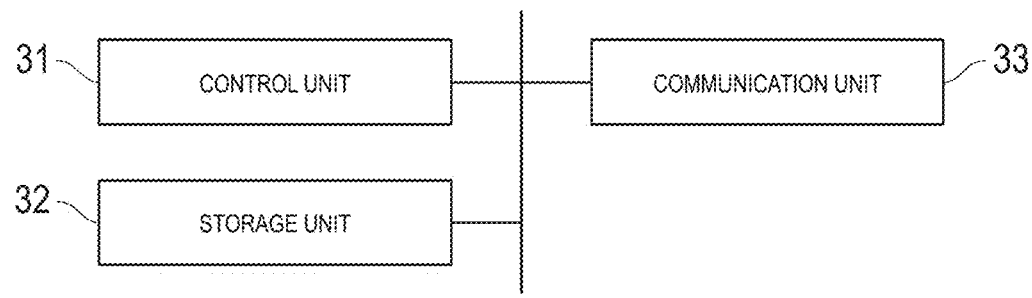
FIG. 4 is a block diagram illustrating a schematic configuration of a server.

FIG. 4 is a block diagram illustrating a schematic configuration of the server.

As illustrated in FIG. 4, the server 30 includes a control unit 31, a storage unit 32, and a communication unit 33. The components are connected one another through a bus in a mutually communicable manner. Since the configurations of the control unit 31, the storage unit 32, and the communication unit 33 of the server 30 are the same as those of the control unit 21, the storage unit 22, and the communication unit 23 of the detection terminal 20, respectively, the description of the configurations will be omitted.

The control unit 31 functions as an acquisition unit and a specification unit by reading a program and executing processing. The control unit 31, as an acquisition unit, acquires the identification information transmitted from the detection terminal 20 and the information on the location of the detection terminal 20. Furthermore, the control unit 31, as a specification unit, specifies the location of the object person terminal 10 on the basis of the identification information and the information on the location of the detection terminal 20 acquired by the acquisition unit. Alternatively, the control unit 31, as the specification unit, may specify the location of the object person terminal 10 on the basis of the identification information and the location information transmitted from the second communication unit of the object person terminal 10.

Furthermore, the control unit 31 may function as a management unit, a manager information management unit, a sharing person information management unit, a sharing unit, a setting unit, a schedule acquisition unit, and an attendance information acquisition unit.

The management unit manages information on a location information sharing user who shares information on the location of the object person terminal 10. Here, the location information sharing user includes a manager of the object person that is a user who causes the object person to carry the object person terminal 10 and acquires the information on the location on the object person terminal 10, and a sharing person that is a user who is other than the manager and shares information on the location of the object person terminal 10. The manager information management unit manages information on the manager as information on the location information sharing user. The sharing person information management unit manages information on the sharing person as information on the location information sharing user. The sharing unit shares the information on the location of the object person terminal 10 with the location information sharing user set to be able to share the information on the location of the object person terminal 10 in the management unit. The setting unit sets a sharing condition under which the information on the location is able to be shared for each of the sharing persons. The schedule acquisition unit acquires an activity schedule such as travel or movement of the object person. The attendance information acquisition unit acquires the attendance information on the work or the like of the object person. Furthermore, the control unit 31 outputs information on the location of the object person terminal 10 specified by the specification unit. The control unit 31 may output the information on the location as coordinate information such as two-dimensional, three-dimensional, or other coordinate information, or may convert the coordinate information into an address, an area name, or the like according to a predetermined rule and output the converted information as the address or the area name.

The storage unit 32 stores, as information on the object person and the object person terminal 10, the identification information of the object person terminal 10, attribute information such as a name, an age, and the like of the object person who holds the object person terminal 10, attribute information such as a name, a contact address, and the like of a guardian of the object person, and the like, in association with one another. Furthermore, the storage unit 32 stores information on the manager and the sharing persons of the object person who are location information sharing users, and information on a sharing condition, in association with the information on the object person and the object person terminal 10. Details of information on the location information sharing user and the sharing condition will be described later.

In addition, the storage unit 32 stores, as the information on the detection terminal 20, the identification information of the detection terminal 20, attribute information indicating whether the detection terminal 20 is a fixed terminal or a mobile terminal, information on the location of the detection terminal 20 in a case of being a fixed terminal, and the like, in association with one another.

The storage unit 32 also stores a time setting flag for setting the second time interval of the object person terminal 10, flag information on the emergency flag, the sound distribution flag, and the like, information on a range of the watching area for setting various flags, and the like. The range of the watching area may be defined by a range of coordinate information such as two-dimensional, three-dimensional, or other coordinate information, or may be defined by an address, an area name, or the like corresponding to the range of the coordinate information. In addition, the storage unit 32 also stores information on a predetermined range within the watching area where the object person terminal 10 is assumed to easily go outside the watching area, information on environments of regions within the watching area, information on a degree of danger according to the environment, information on a degree of danger according to a time zone of each region, and the like. In addition, the storage unit 32 also stores a value of the second time interval set for each object person terminal 10 according to a state of specifying the location, a moving state, and a moving speed of the object person terminal 10, and an environment, a time zone, and the like of a section where the object person terminal 10 is present.

<Manager Terminal 40>

The manager terminal 40 is a terminal used by a manager such as a guardian or the like who causes the object person to carry the object person terminal 10 and acquires information on the location of the object person terminal 10, and protects and manages the object person. The manager terminal 40 receives a notification from the server 30 to notify the manager of it, or accesses the server 30 to acquire and display the object person sound information and the information on the location of the object person stored in the server 30.

Figure 5:
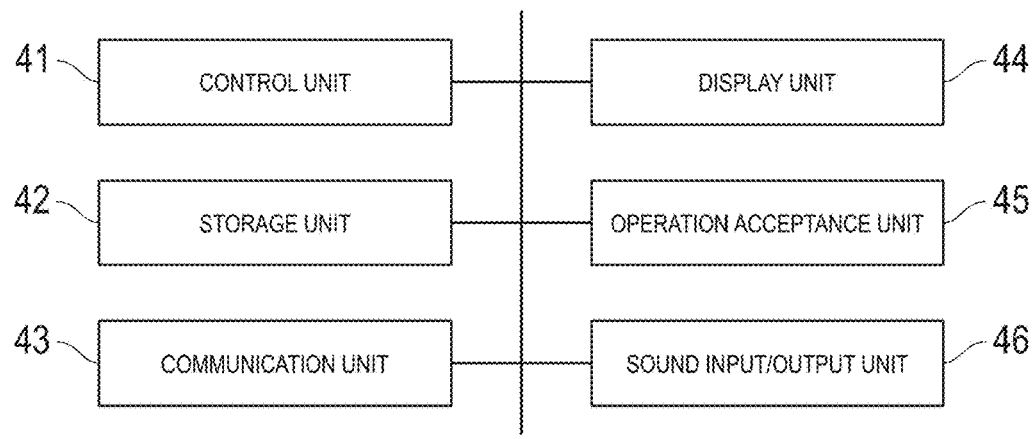
FIG. 5 is a block diagram illustrating a schematic configuration of a manager terminal.

FIG. 5 is a block diagram illustrating a schematic configuration of the manager terminal.

As illustrated in FIG. 5, the manager terminal 40 includes a control unit 41, a storage unit 42, a communication unit 43, a display unit 44, an operation acceptance unit 45, and a sound input/output unit 46. The components are connected one another through a bus in a mutually communicable manner. Since the configurations of the control unit 41, the storage unit 42, and the communication unit 43 of the manager terminal 40 are the same as those of the control unit 21, the storage unit 22, and the communication unit 23 of the detection terminal 20, respectively, the description of the configurations will be omitted.

The display unit 44 includes an LCD (liquid crystal display), an organic EL display, and the like, and displays various types of information.

The operation acceptance unit 45 includes a touch sensor, a pointing device such as a mouse or the like, a keyboard, and the like, and accepts various operations of the user. The display unit 44 and the operation acceptance unit 45 may constitute a touch panel by superimposing a touch sensor as the operation acceptance unit 45 on a display surface as the display unit 44. The operation acceptance unit 45 accepts, from the manager, for example, an instruction for acquiring and outputting object person sound information from the server 30.

The sound input/output unit 46 includes a microphone, a sound input terminal, or the like for inputting a sound, and a speaker, a sound output terminal, or the like for outputting a sound. The sound input/output unit 46 outputs, for example, a sound corresponding to the object person sound information acquired from the server 30, and accepts an input of distribution sound information for distribution to the object person.

<Sharing Person Terminal 50>

The sharing person terminal 50 is a terminal used by a sharing person who is other than the manager and shares information on the location of the object person terminal 10. The sharing person terminal 50 of a user registered as a sharing person in advance on the basis of an instruction of the manager can receive a notification from the server 30 to notify the sharing person of it, or access the server 30 to acquire and display the information on the location of the object person stored in the server 30.

Figure 6:
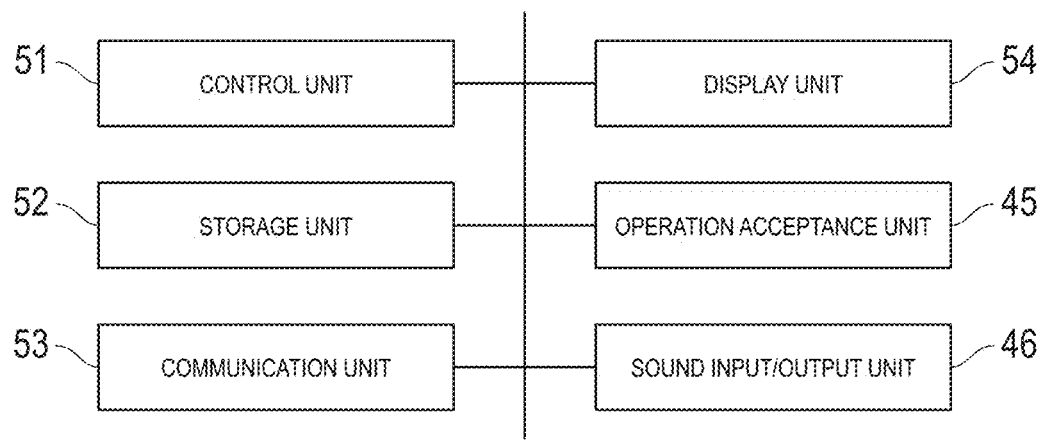
FIG. 6 is a block diagram illustrating a schematic configuration of a sharing person terminal.

FIG. 6 is a block diagram illustrating a schematic configuration of the sharing person terminal.

As illustrated in FIG. 6, the sharing person terminal 50 includes a control unit 51, a storage unit 52, a communication unit 53, a display unit 54, an operation acceptance unit 55, and a sound input/output unit 56. The components are connected one another through a bus in a mutually communicable manner. Since the configurations of the control unit 51, the storage unit 52, the communication unit 53, the display unit 54, the operation acceptance unit 55, and the sound input/output unit 56 of the sharing person terminal 50 are the same as those of the control unit 41, the storage unit 42, the communication unit 43, the display unit 44, the operation acceptance unit 45, and the sound input/output unit 46 of the manager terminal 40, respectively, the description of the configurations will be omitted.

Note that each of the object person terminal 10, the detection terminal 20, the server 30, the manager terminal 40, and the sharing person terminal 50 may include a component other than the above-described components, or may not include part of the above-described components.

<Outline of Processing>

Next, a flow of processing in the location information sharing control system will be described.

<Location Specifying Processing>

Figure 7:
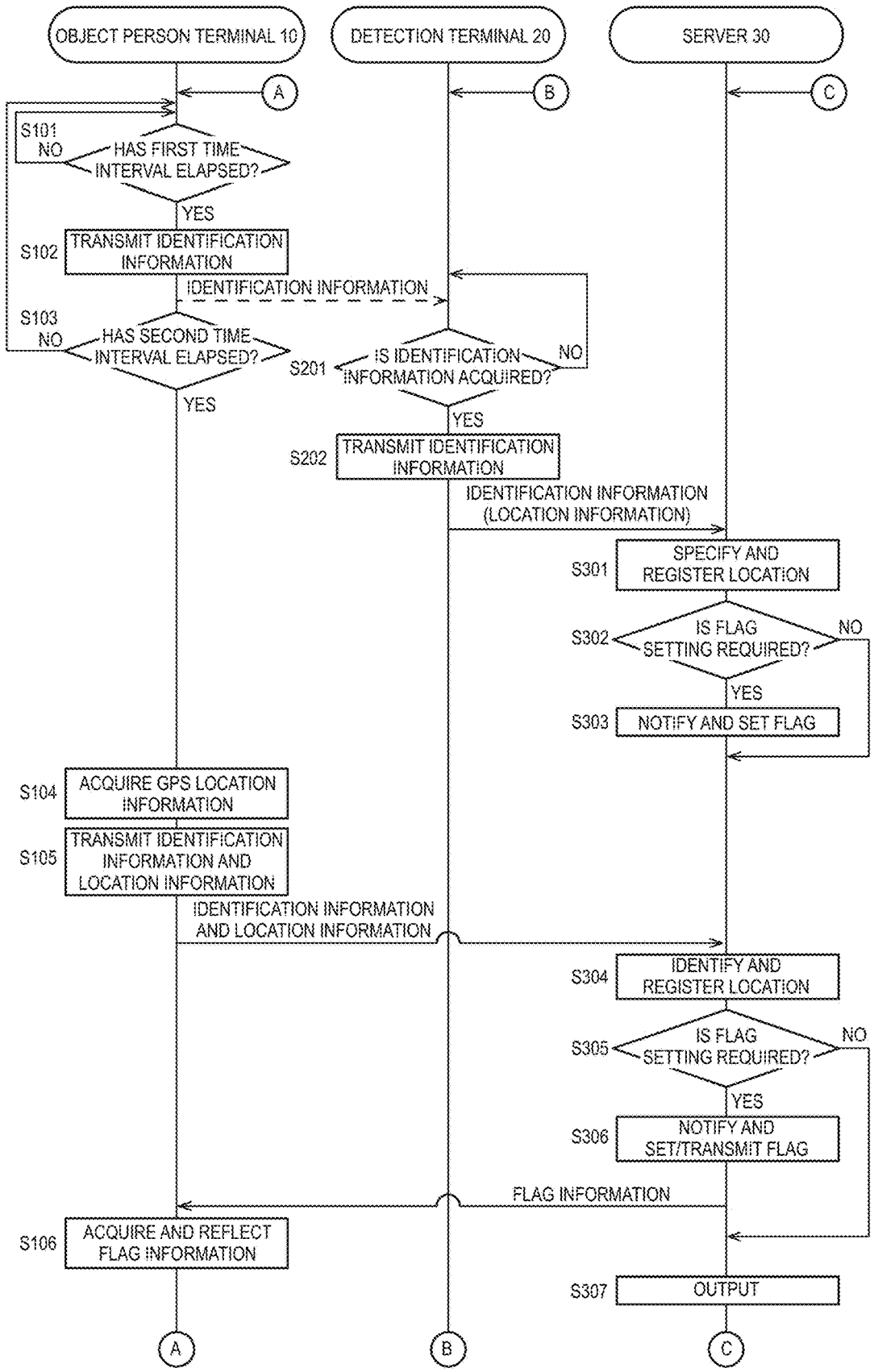
FIG. 7 is a sequence chart illustrating a flow of location specifying processing executed in the location information sharing control system.
Figure 8A:
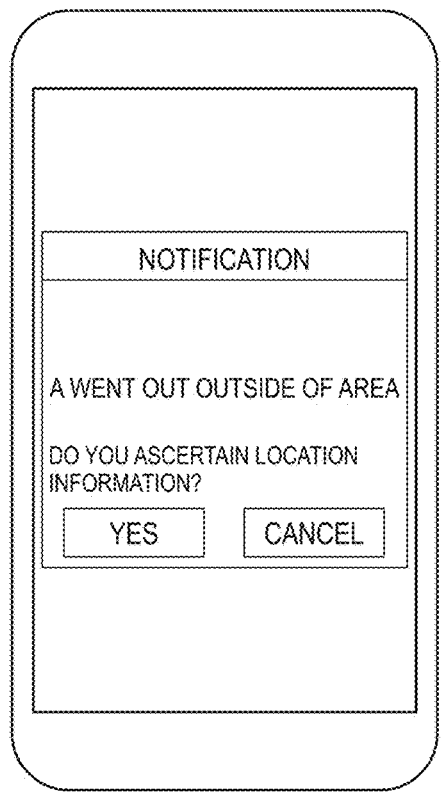
FIGS. 8A-8C are diagrams illustrating examples of a screen expressing location information output by a server.
Figure 8B:
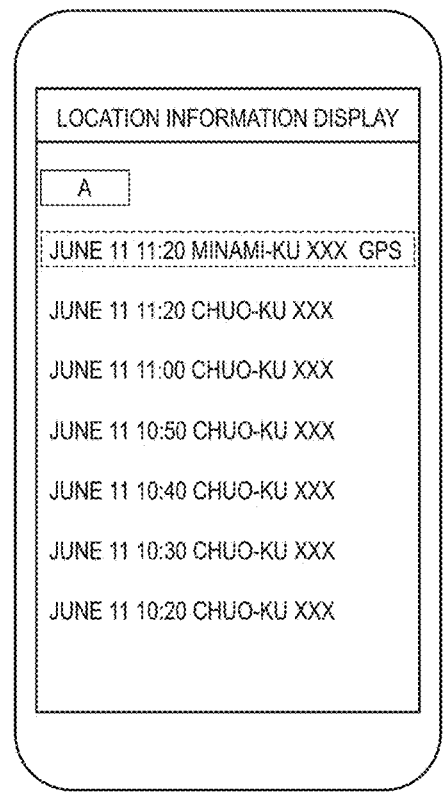
Figure 8C:
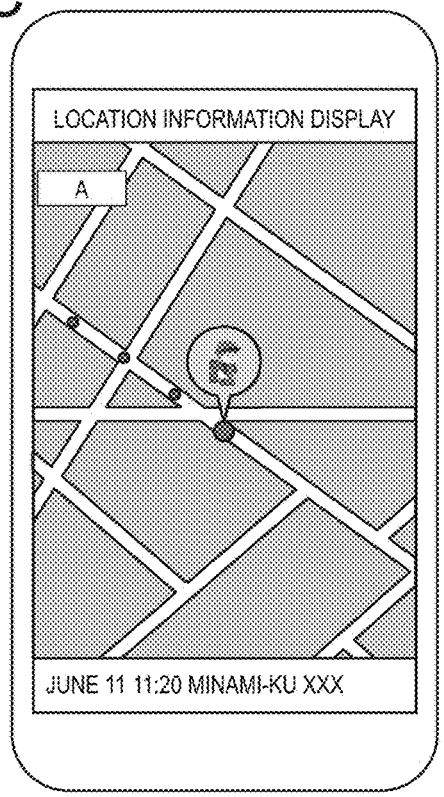

FIG. 7 is a sequence chart illustrating a flow of location specifying processing executed in the location information sharing control system. FIGS. 8A-8C are diagrams illustrating examples of a screen expressing location information output by a server.

First, processing of the object person terminal 10 will be described.

As illustrated in FIG. 7, the object person terminal 10 determines whether the first time interval has elapsed (step S101). When the first time interval has not elapsed (step S101: NO), the object person terminal 10 waits until the first time interval elapses.

When the first time interval has elapsed (step S101: YES), the object person terminal 10 outputs a signal for performing the short-range wireless communication by the first communication unit 13, and transmits identification information for identifying the object person terminal 10 via the short-range wireless communication to the surroundings (step S102). Since a relatively short time interval of about 3 seconds is set as the first time interval, the object person terminal 10 constantly transmits the identification information in a short cycle. As the first time interval, a constant value may be set as a fixed value, or a variable value may be set. Note that the first communication unit 13 may output a radio wave for performing the short-range wireless communication at the first time interval, and transmit the identification information to another party when communication with the other party is established. Alternatively, the first communication unit 13 may transmit the identification information at the first time interval regardless of whether communication with the other party is established.

Subsequently, the object person terminal 10 determines whether the second time interval has elapsed (step S103). When the second time interval has not elapsed (step S103: NO), the object person terminal 10 returns to the processing of step S101 and repeats the processing of performing the short-range wireless communication.

When the second time interval has elapsed (step S101: YES), the object person terminal 10 acquires location information of the object person terminal 10 on the basis of a signal from the GPS satellite by the second communication unit 14 using a known technique (step S104). Then, the object person terminal 10 transmits the location information of the object person terminal 10 acquired in the processing of step S104 and the identification information for identifying the object person terminal 10 to the server 30 via the long-range wireless communication (step S105). Since a relatively long time interval of about one hour is set as the second time interval, the object person terminal 10 transmits, while transmitting the identification information via the short-range wireless communication in a short cycle as described above, the identification information and the location information acquired by the GPS function to the server 30 via the long-range wireless communication in a long cycle such as every hour or the like. Note that, as described above, when a value corresponding to the moving state and the moving speed of the object person terminal 10 is set as the second time interval, the object person terminal 10 uses the second time interval corresponding to the moving state and the moving speed of the object person terminal 10 determined from the detection information of the acceleration sensor or the like.

Subsequently, the object person terminal 10, when communicating with the server 30 and having acquired time setting flag information for changing the second time interval from the server 30 in the processing of step S105, changes the second time interval on the basis of the content of the flag information (step S106). Moreover, the object person terminal 10, when communicating with the server 30 and having acquired the emergency flag or the sound distribution flag in the processing of step S105, executes processing corresponding to each flag to be described later.

The object person terminal 10 repeatedly executes the processing of steps S101 to S106.

Next, processing of the detection terminal 20 will be described.

The detection terminal 20 detects the object person terminal 10 with which communication is possible, and determines whether identification information has been acquired from the object person terminal 10 (step S201). When not having acquired the identification information (step S201: NO), the detection terminal 20 continues processing for detecting the object person terminal 10 and acquiring the identification information until the identification information can be acquired.

When having acquired the identification information (step S201: YES), the detection terminal 20 transmits the acquired identification information to the server 30 (step S202).

Here, when the detection terminal 20 is a fixed terminal (detection terminal 20a), the detection terminal 20a transmits information for identifying the detection terminal 20a to the server 30 together with the identification information. This is because the information on the location of each detection terminal 20a is stored in advance in the storage unit 32 of the server 30 in association with the information for identifying the detection terminal 20a. As a result, the server 30 can use the information for identifying the detection terminal 20a received together when receiving the identification information of the object person terminal 10 from the detection terminal 20a, to acquire the information on the location of the detection terminal 20a from the storage unit 32.

On the other hand, when the detection terminal 20 is a mobile terminal (detection terminal 20b), the detection terminal 20b uses the GPS function, to acquire information on the location of each detection terminal 20b on the basis of a signal from the GPS satellite, and transmits the information to the server 30 together with the identification information. As a result, the server 30 can acquire the information indicating the location of the detection terminal 20b on the basis of the information received together when receiving the identification information of the object person terminal 10 from the detection terminal 20b.

The detection terminal 20 repeatedly executes the processing of steps S201 to S202.

Next, processing of the server 30 will be described.

The server 30 receives the identification information of the object person terminal 10 from the detection terminal 20, acquires the information on the location of the detection terminal 20 as described above, and specifies the location of the object person terminal 10 corresponding to the identification information on the basis of the acquired information (step S301). The server 30 registers the identification information of the object person terminal 10 and the specified location in the storage unit 32 in association with one other.

Subsequently, the server 30 determines whether setting of various flags is necessary on the basis of the state of specifying the location of the object person terminal 10 in the processing of step S301 (step S302). For example, the server 30 determines whether it is necessary to change the frequency of location information acquisition using the GPS function, that is, the second time interval on the basis of the state of specifying the location of the object person terminal 10, and determines whether it is necessary to set the time setting flag. Moreover, the server 30 determines whether it is necessary to set the emergency flag on the basis of the state of specifying the location of the object person terminal 10. Note that the server 30 may individually determine whether it is necessary to set the time setting flag and the emergency flag on the basis of independent conditions, correspondingly.

For example, the server 30, when the location of the specified object person terminal 10 is included in a predetermined range within the watching area set in advance, determines that it is necessary to set the time setting flag and the emergency flag for the object person terminal 10. Note that different regions can be set for the predetermined range for setting the time setting flag and the predetermined range for setting the emergency flag, respectively. For example, the predetermined range for setting the time setting flag is a peripheral region of the watching area where the object person terminal 10 is expected to go outside the watching area, and a region including a station or a bus stop where the object person can get on and off transportation such as a train, a bus, and the like that can move a long distance, or a railroad, a bus road, and the like on which a train or a bus travels. In addition, the predetermined range for setting the time setting flag and the emergency flag is, for example, a region in which the degree of danger is determined to be high from an attribute (residential area, office area, shopping street, nightlife, or the like), a security level, a traffic volume level, a sufficiency level of watching (degree of sufficiency of the detection terminals 20a and 20b), an incident/accident occurrence degree, a suspicious person information occurrence degree, a disaster occurrence degree, and the like of the section. The degree of danger for each region can be dynamically changed. For example, when an incident, an accident, or a disaster occurs, any desired range can be set to a region in which the degree of danger is high, as an incident/accident occurrence section or a disaster occurrence section.

In addition, the server 30 may determine that the second time interval of the object person terminal 10 needs to be changed to be short when the object person terminal 10 is determined to be moving from a predetermined range such as a peripheral region or the like within the watching area toward the outside of the watching area on the basis of transition of the specified position of the object person terminal 10. This is because the object person terminal 10 is highly likely to go outside the watching area from now.

Furthermore, the server 30 may determine, on the basis of a specified location of the object person terminal 10, a section including the location, acquire a value of the second time interval set in advance according to the environment of the section, and determine that the second time interval of the object person terminal 10 needs to be changed when the acquired value is different from the value used in the object person terminal 10. As the environment of the section, for example, an attribute of the section (residential area, office area, shopping street, nightlife, or the like), a security level, a traffic volume level, a sufficiency level of watching (degree of sufficiency of the detection terminals 20a and 20b), an incident/accident occurrence degree, a suspicious person information occurrence degree, a disaster occurrence degree, and the like of the section are set, and according to the environment of the section, the second time interval may be set for each object person terminal 10. Furthermore, the attribute of the section can be dynamically changed. For example, when an incident, an accident, or a disaster occurs, any desired range can be set as an incident/accident occurrence section or a disaster occurrence section.

Furthermore, the server 30 may determine, on the basis of a specified location of the object person terminal 10, a section including the location, acquire a value of the second time interval set in advance according to a time zone for the section, and when the acquired value is different from the value used in the object person terminal 10, determine that the second time interval of the object person terminal 10 needs to be changed. For example, for a section in which it is relatively safe in the daytime but the degree of danger during night is high from the viewpoint of the security level, the traffic volume level, the sufficiency level of watching, and the like, the second time interval in the daytime time zone can be set to be long and the second time interval in the nighttime time zone can be set to be short.

Furthermore, when the identification information transmitted from the first communication unit 13 of the object person terminal 10 is not acquired for a predetermined time, the server 30 may determine that the time setting flag and the emergency flag of the object person terminal 10 corresponding to the identification information need to be set.

Furthermore, the server 30 may set the time setting flag and the emergency flag of the object person terminal 10 when the object person terminal 10 moves from the predetermined range within the watching area to a range other than the predetermined range within the watching area on the basis of the transition of the location of the specified object person terminal 10.

Note that the server 30 may execute a plurality of various determination methods as described above in combination.

When it is determined that the various flags do not need to be set (step S302: NO), the server 30 proceeds to the processing of step S304 or step S301. The server 30 returns to the processing of step S301 when receiving the identification information from the detection terminal 20, and proceeds to the processing of step S304 when receiving the identification information from the object person terminal 10.

When it is determined that the various flags need to be set (step S302: YES), the server 30 notifies the manager terminal 40 and the sharing person terminal 50 satisfying a sharing condition to be described later that are associated in advance with the object person terminal 10, and sets the time setting flag and the emergency flag of the object person terminal 10 (step S303). By setting the time setting flag and the emergency flag as described above, the object person terminal 10, when communicating with the server by the second communication unit 14, can acquire each of the flags described above, and can execute the corresponding processing on the basis of the content of the acquired flag.

Here, the notification to the manager terminal 40 and the sharing person terminal 50 is executed, for example, by displaying a notification screen as illustrated in FIG. 8A on the display unit of each terminal. Alternatively, the notification to the manager terminal 40 and the sharing person terminal 50 may be executed by transmitting a message to an electronic mail address registered in advance or an account of various messaging applications, SNS services, or the like.

For example, when the "Yes" button is pressed on the screen illustrated in FIG. 8A, the server 30 transmits the location information of the corresponding object person to each terminal (corresponding to the processing of step S307 described later). As a result, for example, a location information display screen as illustrated in FIG. 8B is displayed on the display unit of each terminal.

In the screen of FIG. 8B, the transition of the location information of "A" who is the object person is displayed in time series from the lower side to the upper side of the screen. In this screen, it is indicated that A, who was located in "Chuo-ku", which is a watching area, from 9:00 AM to 11:00 AM, is located in "Minami-ku", which is outside the watching area, at 11:20 AM is sensed from GPS information. Furthermore, by pressing the display of each record indicating the location information on the screen of FIG. 8B, the detailed location information including map information may be displayed as illustrated in the screen of FIG. 8C. Note that the display order and display contents of the screen are not limited to the above examples, and the location information of the object person can be displayed by various methods. For example, the screen of FIG. 8C may be displayed when the "YES" button is pressed on the screen of FIG. 8A, and the screen of FIG. 8B may be displayed when a predetermined operation such as pressing of a history button, or the like is performed.

In addition, the server 30 specifies the location of the object person terminal 10 corresponding to the identification information on the basis of the identification information and the location information transmitted from the second communication unit 14 of the object person terminal 10 (step S304). The server 30 registers the identification information of the object person terminal 10 and the specified location in the storage unit 32 in association with one other.

Subsequently, the server 30 determines whether the various flags need to be set on the basis of the state of specifying the location of the object person terminal 10 in the processing of step S304 (step S305).

For example, the server 30 determines whether the various flags need to be set by a method similar to the processing of step S302 described above on the basis of the location of the object person terminal 10 specified in the processing of step S304.

Furthermore, when the location of the object person terminal specified in the processing of step S304 is outside the watching area, the server 30 may determine that the various flags of the object person terminal 10 need to be set.

When it is determined that the various flags do not need to be set (step S305: NO), the server 30 proceeds to the processing of step S307.

When it is determined that the various flags need to be set (step S305: YES), the server 30 notifies the manager terminal 40 and the sharing person terminal 50 satisfying a sharing condition to be described later that are associated in advance with the object person terminal 10, and sets the time setting flag and the emergency flag of the object person terminal 10, and transmits the time setting flag to the object person terminal 10 (step S306). As a result, the object person terminal 10 can acquire each flag described above and execute corresponding processing on the basis of the content of the acquired flag.

Subsequently, the server 30 outputs the information registered in the processing of step S301 and step S304, the information notified in the processing of step S303 and step S306, and the like in a browsable manner on the manager terminal 40 and the sharing person terminal 50 (step S307). This output processing can be executed at any desired timing on the basis of a request or the like from the manager terminal 40 and the sharing person terminal 50.

Note that, in the sequence chart of FIG. 6, the description has been given as a flow that the server 30 receives the identification information of the object person terminal 10 directly from the object person terminal 10 after receiving the identification information of the object person terminal 10 via the detection terminal 20, but in practice, when the identification information is received from the detection terminal 20, the processing of step S301 is executed and when the identification information is received from the object person terminal 10, the processing of step S304 is executed. Furthermore, in an actual use environment of the present system, it is assumed that a plurality of the object person terminal 10 and a plurality of the detection terminals 20 are provided, and the server 30 executes the above-described processing for each of the plurality of the object person terminal 10 and each of the plurality of the detection terminals 20.

<Emergency Information Acquisition Processing>

When the emergency acceptance unit 151 of the object person terminal 10 accepts the instruction regarding the occurrence of the emergency, regardless of the processing flow of the sequence chart of FIG. 6, the object person terminal 10 executes the processing of steps S104 and S105, acquires the location information using the GPS function, and transmits a notification indicating the occurrence of a matter of emergency including the identification information and the location information to the server 30. At that time, the object person terminal 10 can acquire ambient sounds and images (video) around the object person terminal 10 by the acquisition unit 16 and transmit information indicating the sounds and the images (video) to the server 30.

In addition, the instruction regarding the occurrence of a matter of emergency is not limited to a form of being accepted in the emergency acceptance unit 151 of the object person terminal 10, and may be accepted in a form in which the emergency flag indicating the occurrence of a matter of emergency is set in the server 30. In this case, when the object person terminal 10 periodically communicates with the server 30 and acquires the emergency flag, the instruction for notifying the occurrence of a matter of emergency is accepted in the object person terminal 10, and processing of acquiring location information using the GPS function and transmitting the location information to the server 30, or the like is executed.

<Location Information Sharing Control Processing>

Next, location information sharing control processing will be described.

First, relationship among the object person, the manager, and the sharing person and the information registered in the server 30 to provide this relationship will be described, and then the registration processing and the location information sharing control processing will be described.

(Relationship Among Object Person, Manager, and Sharing Person)

Figures 9, 10:
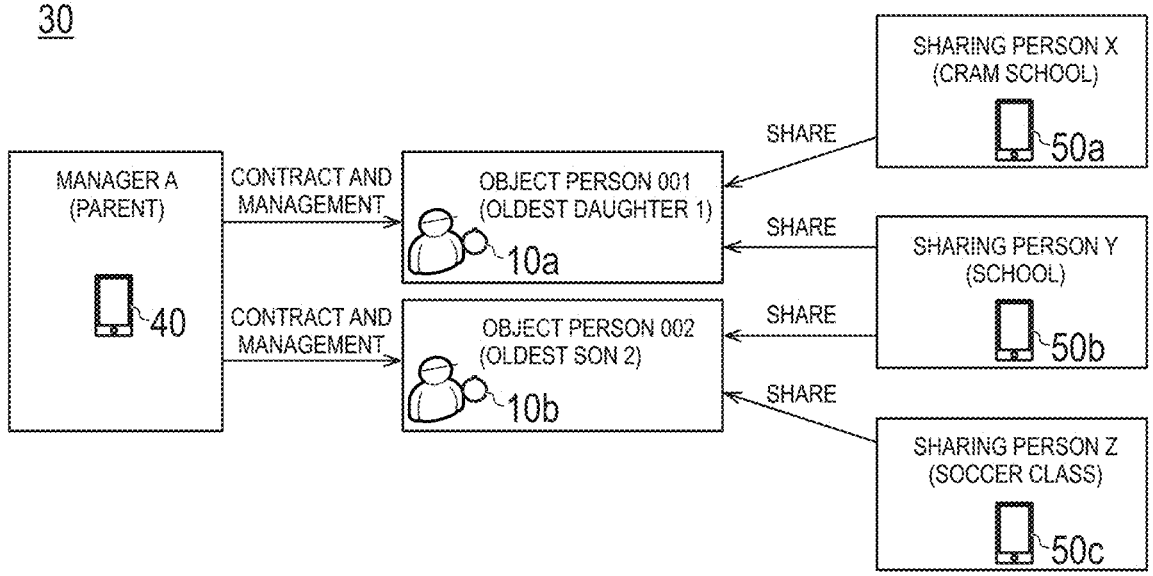
FIG. 9 is a conceptual diagram for explaining a relationship among object persons and object person terminals, a manager and a manager terminal, and sharing persons and sharing person terminals.
FIG. 10 is a diagram illustrating an example of information on object persons and object person terminals and information on location information sharing users and sharing conditions that are stored in the server in an associated manner.

FIG. 9 is a conceptual diagram for explaining a relationship among object persons and object person terminals, a manager and a manager terminal, and sharing persons and sharing person terminals.

As illustrated in FIG. 9, for example, a parent who is a manager A subscribes to a location information providing service that provides location information of object person terminals 10a and 10b, and manages the object person terminals 10a and 10b and their location information.

The manager A causes the oldest daughter 1 who is an object person 001 to carry the object person terminal 10a, and causes the oldest son 2 who is an object person 002 to carry the object person terminal 10b. The manager A acquires the location information of the object person terminals 10a and 10b via the manager terminal 40.

Since the oldest daughter 1 goes to a cram school and a school, the location information of the object person terminal 10a of the oldest daughter 1 is shared by a sharing person terminal 50a used by a related person related to the cram school as a sharing person X and a sharing person terminal 50b used by a related person related to the school as a sharing person Y on the basis of an instruction of the parent in a case where a predetermined sharing condition is satisfied.

Since the oldest son 2 goes to the school and a soccer class, the location information of the object person terminal 10b of the oldest son 2 is shared by the sharing person terminal 50b used by the related person related to the school as the sharing person Y and a sharing person terminal 50c used by a related person related to the soccer class as a sharing person Z on the basis of an instruction of the parent in a case where a predetermined sharing condition is satisfied.

(Various Information Stored in Server 30)

FIG. 10 is a diagram illustrating an example of information on object persons and object person terminals and information on location information sharing users and sharing conditions that are stored in the server in an associated manner.

As illustrated in FIG. 10, the storage unit 32 of the server 30 stores information on the object persons and the object person terminals 10, information on the manager and the manager terminal 40, information on the sharing persons and the sharing person terminals 50, and information on sharing conditions for sharing the location information with each sharing person, in association with each other.

(Information on Object Person 001)

For example, the information on the object person 001 (oldest daughter 1) is associated with the information on the object person terminal 10a. In these pieces of information, the information on the manager A that is the manager of the object person 001 and on a manager terminal 40a and the information on the sharing persons X and Y who are sharing persons registered in advance by the manager A and on the sharing person terminals 50a and 50b are stored in association with each other.

As the sharing condition that enables the sharing person terminal 50a of the sharing person X to share the location information of the object person terminal 10a, "Tuesday 18:30-21:30" that is a condition regarding time is set. Thus, for example, when the class time of the cram school corresponding to the sharing person X is 19:00 to 21:00 on Tuesday, it is possible to cause the sharing person X to acquire the location information of the object person terminal 10a only during the period including the time on the way to the cram school and the time on the way back from the cram school.

Similarly, as the sharing condition that enables the sharing person terminal 50*b* of the sharing person Y to share the location information of the object person terminal 10*a*, "Weekdays 8:30-17:00" that is a condition regarding time is set. Thus, for example, when the class time of the school corresponding to the sharing person Y is 9:00 to 16:30 weekdays, it is possible to cause the sharing person Y to acquire the location information of the object person terminal 10*a* only during the period including the time on the way to the school and the time on the way back from the school.

(Information on Object Person 002)

For example, the information on the object person 002 (first son 2) is associated with the information on object person terminal 10*b*. In these pieces of information, the information on the manager A that is the manager of the object person 002 and on a manager terminal 40*a* and the information on the sharing persons Y and Z who are sharing persons registered in advance by the manager A and on the sharing person terminals 50*b* and 50*c* are stored in association with each other.

As the sharing condition that enables the sharing person terminal 50*b* of the sharing person Y to share the location information of the object person terminal 10*b*, "Weekdays 8:30-15:00" that is a condition regarding time is set. Thus, for example, when the class time of the school corresponding to the sharing person Y is 9:00 to 14:30 weekdays, it is possible to cause the sharing person Y to acquire the location information of the object person terminal 10*b* only during the period including the time on the way to the school and the time on the way back from the school.

Similarly, as the sharing condition that enables the sharing person terminal 50*c* of the sharing person Z to share the location information of the object person terminal 10*b*, "Wednesday 17:30-20:30" that is a condition regarding time is set. Thus, for example, when the practice time of the soccer class corresponding to the sharing person Z is 18:00 to 20:00 on Wednesday, it is possible to cause the sharing person Z to acquire the location information of the object person terminal 10*b* only during the period including the time on the way to the soccer class and the time on the way back from the soccer class.

(Information on Object Person 003)

An object person 003 is, for example, a traveler who participates in a bus tour. While participating in the tour, the object person 003 carries an object person terminal 10*c* lent by a travel agency or the like that is an organizer of the tour. A manager B is an organizer of the tour that manages the object person terminal 10*c*, and uses a manager terminal 40*b*. A sharing person P is a tour conductor, a tour bus driver, or the like who is a sharing person registered in advance by the manager B, and uses a sharing person terminal 50*d*. Note that the object person terminal 10*c* is not limited to a form lent by the travel agency or the like. For example, in a case where the object person 003 has already possessed the object person terminal 10*c* given from the parent or the like, the object person terminal 10*c* can be used. In this case, the parent or the like of the object person 003 is registered as the manager B, and the organizer of the tour, the tour conductor, or the like is set as the sharing person P.

The information on the object person 003 is associated with the information on the object person terminal 10*c*. In these pieces of information, the information on the manager B and the manager terminal 40*b* and the information on the sharing person P and the sharing person terminal 50*d* are stored in association with each other.

As a sharing condition under which the location information of the object person terminal 10*c* can be shared with the sharing person terminal 50*d* of the sharing person P, "30 minutes before and after a meeting time of the tour" that is a condition regarding time and "a range of 50 m from the tour bus" that is a condition regarding a location are set. As a result, for example, it is possible to prevent the sharing person P from acquiring the location information of the object person terminal 10*c* during a free activity time of the tour, and to cause the sharing person P to acquire the location information of the object person terminal 10*c* before and after the meeting time or near the tour bus. As a result, it is possible to ensure safety of the object person 003 and smooth progress of the tour while considering privacy of the object person 003.

In the above case, the server 30 can acquire in advance the activity schedule of the object person 003 including the occurrence time of a predetermined event such as the meeting time of the tour or the like, and set the range of time based on the occurrence time of the event as a time condition of the sharing condition.

Figure 11:
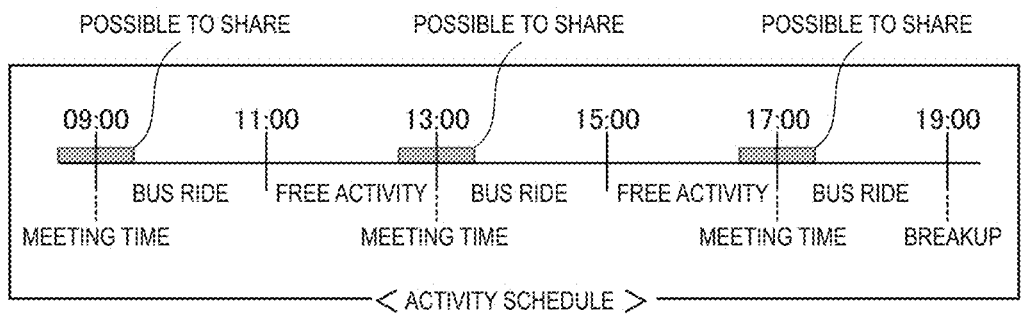
FIG. 11 is a diagram illustrating an example of a method of setting an activity schedule and a sharing condition of the object person acquired by the server.

FIG. 11 is a diagram illustrating an example of a method of setting an activity schedule and a sharing condition of the object person acquired by the server.

As illustrated in FIG. 11, as the activity schedule, a schedule is defined in which a meeting time at the start of the tour is 09:00, a bus ride 09:00 to 11:00, a free activity time 11:00 to 13:00, a meeting time at the end of the free activity time 13:00, a bus ride 13:00 to 15:00, a free activity time 15:00 to 17:00, a meeting time at the end of the free activity time 17:00, a bus ride 17:00 to 19:00, and a breakup time at the end of the tour 19:00. The server 30 acquires the activity schedule and extracts the occurrence time of the "meeting time" set in advance as a predetermined event. Then, the server 30 can set time conditions using predetermined time ranges based on "09:00", "13:00", and "17:00", which are meeting times, as periods in which the location information of the object person terminal 10*c* can be shared.

Note that the method of setting the condition regarding time is not limited to the above example, and can be set by any desired method such as a range of time based on a predetermined time, or the like. The method of setting the condition regarding a location is not limited to the above example also, and can be set by any desired method such as a range based on a predetermined location, or the like.

(Information on Object Person 004)

An object person 004 is, for example, an employee working in a company or the like. The object person 004 carries an object person terminal 10*d* lent by the company or the like. A manager C is a management responsible person of the company or the like that manages the object person terminal 10*d*, and uses a manager terminal 40*c*. A sharing person Q is a boss, a project member, or the like of the object person 004 that is a sharing person registered in advance by the manager C, and uses a sharing person terminal 50*e*. Note that the object person terminal 10*d* is not limited to a form of lending by the company or the like. For example, in a case where the object person 004 has already possessed the object person terminal 10*d* for another use or the like, the object person terminal 10*d* can be used. In this case, since the manager C of the object person 004 is already registered, the management responsible person, the boss, or the like of the company is set as the sharing person Q.

The information on the object person 004 is associated with the information on the object person terminal 10*d*. In these pieces of information, the information on the manager C and the manager terminal 40*c* and the information on the sharing person Q and the sharing person terminal 50*e* are stored in association with each other.

As a sharing condition under which the location information of the object person terminal 10*d* can be shared with the sharing person terminal 50*e* of the sharing person Q, "at work" that is a condition regarding time and "emergency occurrence" that is a condition regarding a state are set. As a result, for example, the location information of the object person terminal 10*d* can be acquired by the sharing person Q only during working hours or when an emergency occurs. Therefore, it is possible to appropriately grasp the work situation of the object person 004 and secure the safety of the object person 004 while considering the privacy of the object person 004.

In the above case, the server 30 can acquire the attendance information of the object person 004 from an attendance system such as a time card system of the company, for example, and set a period during which the object person 004 is assumed to be at work in the attendance information as the time condition of the sharing condition. Furthermore, as the attendance information, information on a break time such as a lunch break may be set, and a sharing condition may be set such that the location information is not shared with the sharing person Q during the break time.

Note that the method of setting the condition regarding a state is not limited to the above example, and conditions regarding any desired state such as conditions regarding various states of an object person, a manager, and a sharing person can be set.

(Registration Processing of Sharing Person and Sharing Condition)

Figure 12:
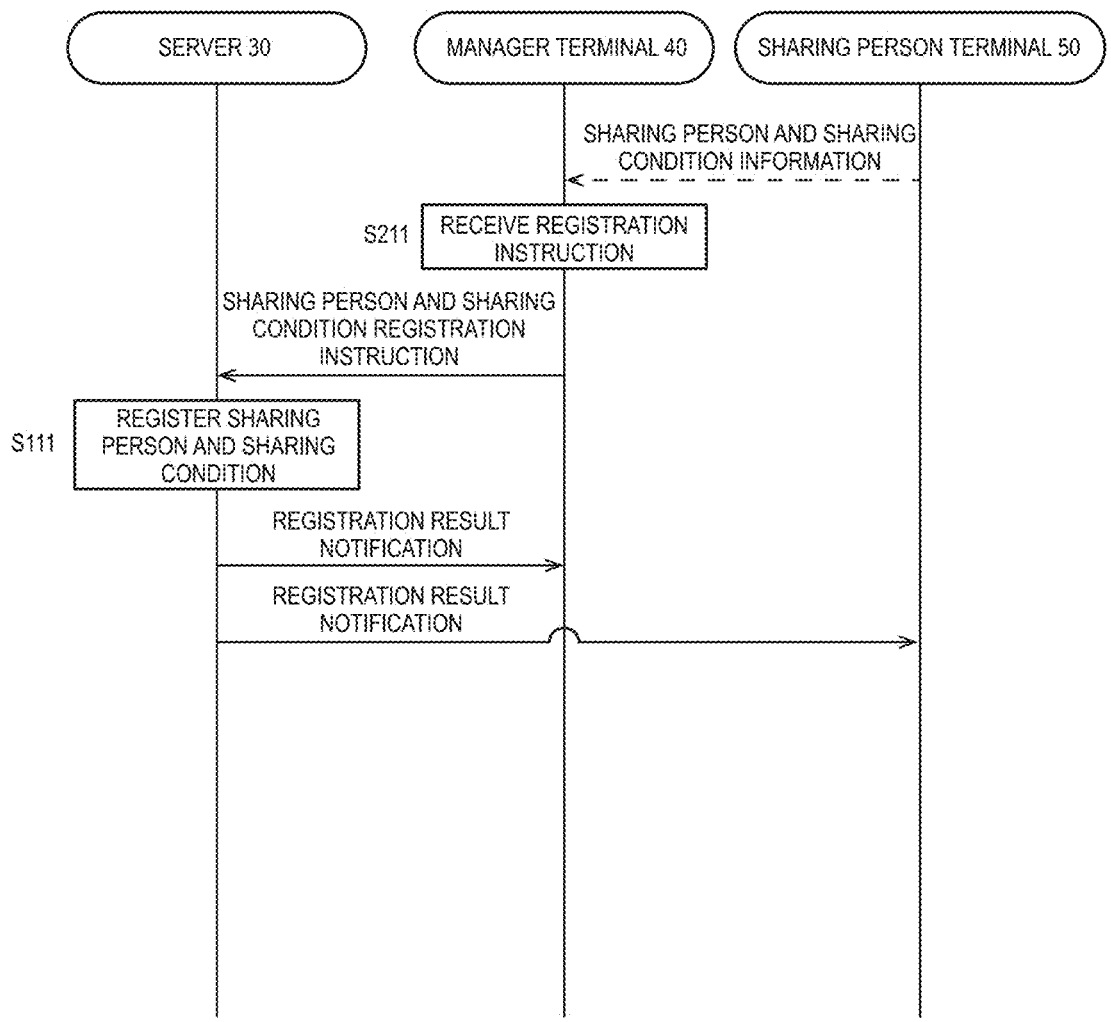
FIG. 12 is a sequence chart illustrating a flow of registration processing for a sharing person and a sharing condition executed in the location information sharing control system.

FIG. 12 is a sequence chart illustrating a flow of registration processing for a sharing person and a sharing condition executed in the location information sharing control system.

As illustrated in FIG. 12, a sharing person who wishes to share the location information of the object person terminal 10 provides a manager with the information on the sharing person and the information on a sharing condition.

The information on the sharing person includes various identification information for identifying the sharing person and the sharing person terminal 50, and address information, account information, and the like for transmitting information to the sharing person and the sharing person terminal 50. The information on the sharing condition includes information indicating the sharing condition for providing the location information of the object person terminal 10 to the sharing person. The provision of the information on the sharing person and the sharing condition may be performed electronically via the sharing person terminal 50 and the manager terminal 40, or may be performed using a paper medium or the like. For example, in the case of using a paper medium, a sheet of paper on which information on the sharing person and the sharing condition that has been encoded to a two-dimensional barcode or the like is printed is handed to the manager. The manager can acquire the information on the sharing person and the sharing condition by reading and decoding the two-dimensional barcode or the like via a dedicated application of the manager terminal 40.

The manager terminal 40 acquires the information on the sharing person and the sharing condition as described above, and accepts, from the manager, a registration instruction for registering the acquired information in association with the object person terminal 10 (step S211). The manager terminal 40 transmits the information on the sharing person and the sharing condition and an instruction for registering the information in association with the object person terminal 10 to the server 30.

On the basis of the information transmitted from the manager terminal 40, the server 30 stores the information on the sharing person and the sharing condition in the storage unit 32 in association with the information on the object person terminal 10 to be subjected, and registers the information as a database as illustrated in FIG. 10 (step S111). The server 30 notifies the manager terminal 40 and the sharing person terminal 50 of the registration result.

(Location Information Sharing Control Processing)

Figure 13:
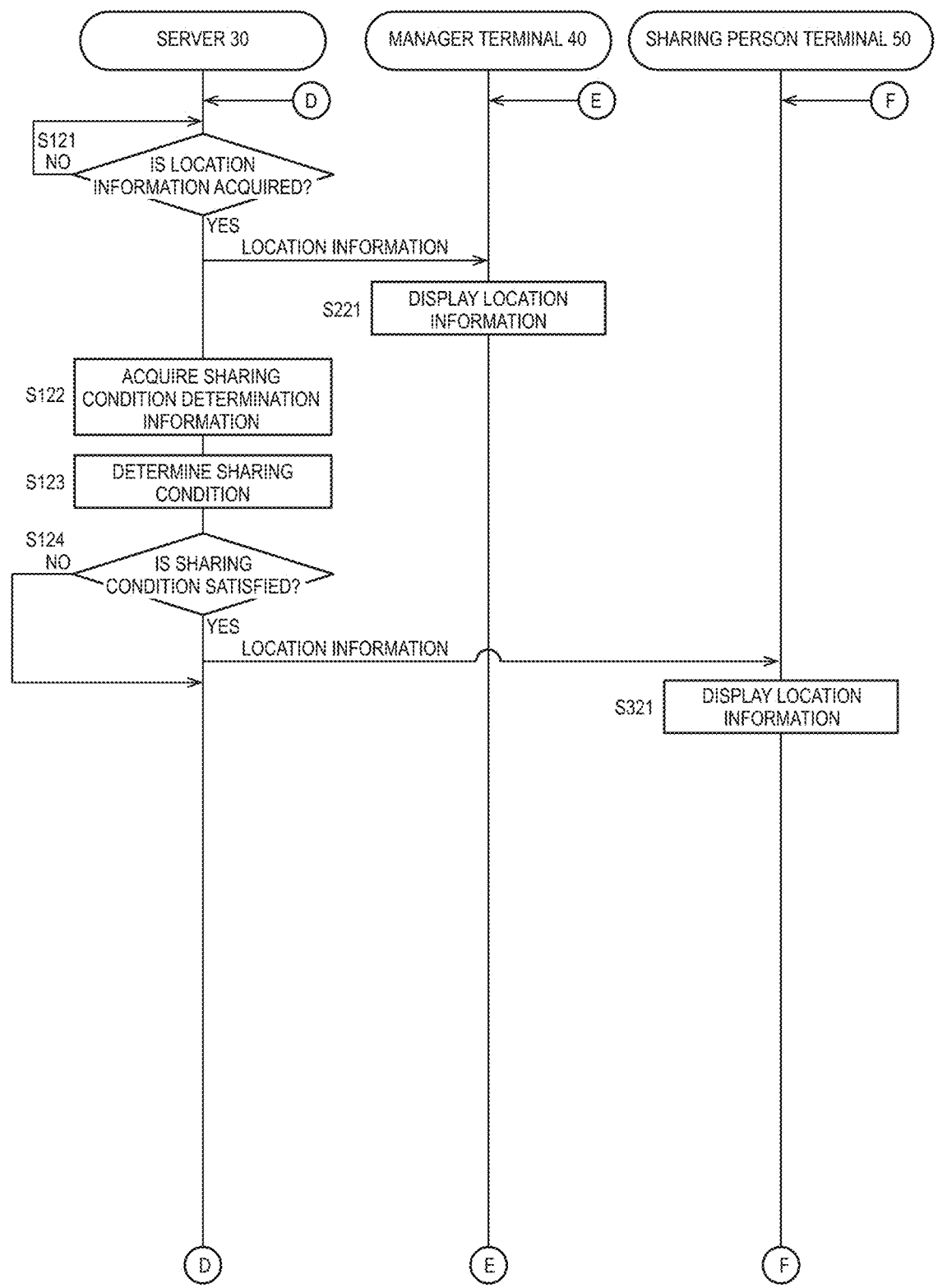
FIG. 13 is a sequence chart illustrating a flow of location information sharing control processing executed in the location information sharing control system.

FIG. 13 is a sequence chart illustrating a flow of location information sharing control processing executed in the location information sharing control system.

As illustrated in FIG. 13, the server 30 determines whether the location information of the object person terminal 10 is acquired (step S121).

When the location information has not been acquired (step S121: NO), the server 30 waits until the location information is acquired.

When the location information has been acquired (step S121: YES), the server 30 transmits the location information to the manager terminal 40 associated with the object person terminal 10. The manager terminal 40 displays the location information on a screen as illustrated in FIGS. 8A-8C, for example (step S221). Note that the server 30 may transmit a notification indicating that the location information has been acquired to the manager terminal 40 instead of transmitting the location information, and transmit the location information when there is a request from the manager terminal 40 that has received the notification.

The server 30 acquires information for determining the sharing condition of each sharing person set in association with the object person terminal 10 (step S122). For example, in a case where a time condition is set as the sharing condition, information on time is acquired, in a case where a location condition is set, information on a location is acquired, and in a case where a state condition is set, information on a state is acquired.

The server 30 determines, on the basis of the information acquired in step S122, the sharing condition of each sharing person set in association with the object person terminal 10 (step S123).

When the sharing condition is not satisfied (step S124: NO), the server 30 returns to the processing of step S121.

When the sharing condition is satisfied (step 5124: YES), the server 30 transmits the location information to the sharing person terminal 50 of the sharing person for which the sharing condition is satisfied. The sharing person terminal 50 displays the location information on a screen as illustrated in FIGS. 8A-8C, for example (step S321). Note that the server 30 may transmit a notification indicating that the location information has been acquired to the sharing person terminal 50 instead of transmitting the location information, and transmit the location information when there is a request from the sharing person terminal 50 that has received the notification. Furthermore, the processing of steps S122 to S124 may be executed together with the processing of step S121.

Note that the present invention is not limited only to the above-described embodiment, and various modifications can be made within the scope of the claims.

For example, in the above embodiment, an example has been described in which the object person terminal 10 functions as the sensing unit, but the present invention is not limited thereto. For example, the server 30 may function as a sensing unit.

In the above embodiment, an example has been described in which whether each flag needs to be set is determined and each flag is set in the server 30, but the above determination and setting of each flag may be executed by the object person terminal 10. In this case, the object person terminal 10 functions as a setting unit.

Furthermore, in the processing of step S104 of FIG. 6, the object person terminal 10 has been described as an object person terminal that uses the GPS function to acquire the location information when the second time interval has elapsed. However, when it can be determined from the information of the acceleration sensor or the like that the location of the object person terminal 10 has not changed from the location at which the location information was previously acquired by using the GPS function, the use of the GPS function may be omitted and the previously acquired location information may be used as it is. As a result, power consumption by the GPS function of the object person terminal 10 can be further suppressed.

Furthermore, in the above embodiment, an example has been described in which each component such as the server 30 or the like included in the location information sharing control system is configured as one independent device, but the configuration of the device is not limited thereto. Each component may include a plurality of devices, or may be included in a device having another function. For example, the server 30 may be configured to be distributed on a cloud server that includes a large number of servers. Alternatively, an application having the function of the server 30 may be installed in the detection terminal 20, the manager terminal 40, or the like, and the processing of the server 30 may be executed in the detection terminal 20 or the manager terminal 40.

Furthermore, in the above embodiment, an example has been described in which the object person terminal 10 is a small dedicated terminal that can be driven by a button battery, but the embodiment is not limited thereto. The object person terminal 10 may be a smartphone, a tablet terminal, or the like, or may be a wearable information terminal worn on an arm, a head, or the like of the object person, an embedded information terminal, or the like. Also in this case, by applying the embodiment as described above, the location of the object person is accurately, reliably, and efficiently specified while the power consumption is significantly reduced.

Furthermore, the processing of the location information sharing control system according to the above-described embodiment may include steps other than the above-described steps, or may not include part of the above-described steps. In addition, the order of the steps is not limited to that of the above-described embodiment. Furthermore, each step may be combined with another step and executed as one step, may be included in another step and executed, or may be divided into a plurality of steps and executed.

Means and methods for performing various types of processing in the location information sharing control system according to the above-described embodiment can be achieved by either a dedicated hardware circuit or a programmed computer. The above program may be provided by, for example, a computer-readable recording medium such as a flexible disk, a CD-ROM, or the like, or may be provided online via a network such as the Internet, or the like. In this case, the program recorded in the computer-readable recording medium is usually transferred to and stored in a storage unit such as a hard disk. Furthermore, the above program may be provided as independent application software, or may be, as one function of the location information sharing control system, incorporated into software of a device of the location information sharing control system.

The location information sharing control system configured as above includes the object person terminal 10, the detection terminal 20, and the server 30. The object person terminal 10 transmits identification information for identifying the object person terminal 10 via the short-range wireless communication. The detection terminal 20 detects an object person terminal 10 with which communication is possible, and acquires identification information sent from the object person terminal 10 when the object person terminal 10 is detected, to transmit the identification information to the server 30. The server 30 acquires the identification information transmitted from the detection terminal 20 and information on a location of the detection terminal 20, and specifies a location of the object person terminal 10 on the basis of the identification information and information on the location of the detection terminal 20 that are acquired. The server 30 manages the information on the location information sharing user who shares the information on the location of the object person terminal 10, and shares the information on the location of the object person terminal 10 with the location information sharing user set to be able to share the information on the location of the object person terminal 10. This provides detection of a location of the object person terminal 10 with good precision while suppressing power consumption of the object person terminal 10, and enables a location information sharing user who needs to share the information on the location of an object person to appropriately grasp the location of the object person as necessary. Therefore, an appropriate related person can accurately and reliably grasp the location of the object person according to various situations in the life of the object person as necessary, and it is possible to construct a secure and safe watching environment.

Moreover, as information on the location information sharing user, the server 30 manages information on the manager of the object person who causes the object person to carry the object person terminal 10 to acquire the information on the location of the object person terminal 10, and manages information on a sharing person who is other than the manager and shares the information on the location of the object person terminal 10. As a result, the location information can be appropriately shared with a related person other than a specific manager such as a parent of the object person.

In addition, the server 30 is able to accept an instruction for changing the information on the sharing person from the manager, and change the information on the sharing person when the instruction is accepted. As a result, the information on the sharing person and the sharing condition is changed on the basis of the instruction of the manager, and thus the information on the location of the object person terminal 10 can be prevented from being shared with an unjust third party, and it is possible to construct a more secure and safe watching environment.

The server 30 sets a condition under which the information on the location of the object person terminal 10 is able to be shared for each of the sharing persons. As a result, for each of various sharing persons who are involved with the object person in the life of the object person, an appropriate sharing condition can be set as necessary, and thus it is possible to construct a secure and safe watching environment in accordance with the life style of the object person while ensuring privacy of the object person.

Furthermore, the server 30 is able to set a time condition regarding time as the sharing condition. As a result, in accordance with the time of various events that regularly or non-regularly occur in the life of the object person, it is possible to cause a related person related to the event to acquire the information on the location of the object person terminal 10. Therefore, it is possible to construct a safe and secure watching environment in accordance with the life style of the object person all the more.

Furthermore, the server 30 is able to set a range of time based on a predetermined time as a time condition. As a result, in a predetermined time range before and after the occurrence time of various events in the life of the object person, it is possible to cause the related person related to the event to acquire the information on the location of the object person terminal 10. Therefore, it is possible to cause a necessary related person to reliably and effectively grasp the location of the object person with simple setting, and it is possible to construct a more secure and safe watching environment.

In addition, the server 30 acquires the activity schedule of the object person and sets, as the time condition, a range of time based on the occurrence time of the predetermined event defined in the activity schedule. As a result, it is possible to cause the related person related to the event to acquire the information on the location of the object person terminal 10 within a predetermined time range based on the occurrence time of the event simply by creating an activity schedule in which the occurrence time of the predetermined event is defined and transmitting the activity schedule to the server 30.

For example, in children's school excursions, various sightseeing tours in which many elderly people or the like participate, and the like, such a problem frequently occurs that some participants of a tour do not gather at a predetermined meeting place even at a meeting time, and search for them takes time and effort, or the progress of the tour is delayed. Therefore, by using the location information sharing control system of the present embodiment, it is possible to acquire in advance a schedule of a bus tour, set a timing at which an object person gathers at a bus as a predetermined event, and cause a tour conductor or the like to grasp the location of the object person 30 minutes before and after the occurrence time of the event, that is, the meeting time at the bus.

Furthermore, even in a case where the meeting time is changed due to a delay in the tour progress or the like, the time condition can be changed only by changing the activity schedule and transmitting the activity schedule to the server 30.

In addition, by providing the detection terminal 20 (the detection terminal 20a or the detection terminal 20b) at a meeting place such as the bus or the like, and counting the number of the object person terminals 10 detected at the location of the detection terminal 20, the number of participants present at the meeting place can be automatically counted. As a result, it is possible to eliminate the need for work such as visual confirmation and call by the tour conductor or the like and to reduce the work load on the tour conductor or the like.

In addition, the server 30 acquires the attendance information of the object person and sets a period during which the object person is assumed to be at work in the attendance information as a time condition. For example, the server 30 can acquire the attendance information of the object person from an attendance system such as a time card system of the company or the like, and set a period during which the object person is assumed to be at work in the attendance information as the time condition. As a result, it is possible to cause the related person such as a boss or the like of the object person to automatically acquire the information on the location of the object person terminal 10 only during working hours without setting the time condition each time. Therefore, it is possible to appropriately grasp the work situation of the object person while securing the privacy of the object person.

Furthermore, the server 30 can set a location condition regarding a location of the object person as a sharing condition. As a result, in accordance with the location of each of various events that occurs in the life of the object person, it is possible to cause a related person related to the event to acquire the information on the location of the object person terminal 10. Therefore, it is possible to construct a safe and secure watching environment in accordance with the life style of the object person all the more.

Furthermore, the server 30 can set a range of location based on a predetermined location as the location condition. As a result, in a predetermined range based on an occurrence location of each of various events in the life of the object person, it is possible to cause a related person related to the event to acquire the information on the location of the object person terminal 10. Therefore, it is possible to cause a necessary related person to reliably and effectively grasp the location of the object person with simple setting, and it is possible to construct a more secure and safe watching environment.

Furthermore, the server 30 can set a state condition regarding a state of the object person as the sharing condition. As a result, in accordance with various states in the life of the object person, it is possible to cause a related person specified in advance to acquire the information on the location of the object person terminal 10. Therefore, it is possible to construct a safe and secure watching environment in accordance with the life style of the object person all the more.

The object person terminal 10 acquires location information of the object person terminal 10 on the basis of a signal from the GPS satellite, and transmits the identification information and the location information to the server 30 via the long-range wireless communication the communication distance of which is longer than the communication distance of the short-range wireless communication, and the server 30 specifies the location of the object person terminal 10 using the identification information and the location information transmitted from the object person terminal 10 via the long-range wireless communication. As a result, even in a case where the location of the object person terminal 10 is not able to be specified via the short-range wireless communication, the location of the object person terminal 10 can be reliably specified via the long-range wireless communication.

In the location information sharing control system, the detection terminal 20a is installed at a predetermined location included in the watching area, and transmits information for identifying the detection terminal 20a to the server 30. Then, the server 30 uses the information for identifying the detection terminal 20a transmitted from the detection terminal 20a, to acquire information on the location of the detection terminal 20a from the storage unit 32 in which the information for identifying the detection terminal 20a and the location of the detection terminal 20a are stored in advance in association with each other. As a result, it is possible to use the detection terminal 20a, which is a fixed terminal installed in the watching area and in which the location information is stored in advance, to accurately specify the location of the object person terminal.

Furthermore, in the location information sharing control system, the detection terminal 20b is provided in a mobile body moving in a region including the watching area, and acquires information on the location of the detection terminal 20*b* on the basis of a signal from the GPS satellite, and transmits the information to the server 30. Then, the server 30 acquires the information on the location of the detection terminal 20*b* on the basis of the information transmitted from the detection terminal 20*b*. As a result, an information terminal such as a smartphone carried by a watching person moving within the watching area or a tablet PC or the like installed in a moving taxi or the like can be used as the detection terminal. Therefore, the location of the object person terminal 10 can be accurately specified without installing fixed terminals throughout the watching area.

REFERENCE SIGNS LIST

10 Object person terminal
11 Control unit
12 Storage unit
13 First communication unit
14 Second communication unit
15 Acceptance unit
151 Emergency acceptance unit
152 Acquisition instruction acceptance unit
16 Acquisition unit
17 Output unit
171 Sound output unit
172 Light output unit
20, 20*a*, 20*b* Detection terminal
21 Control unit
22 Storage unit
23 Communication unit
24 Detection unit
30 Server
31 Control unit
32 Storage unit
33 Communication unit
40 Manager terminal
41 Control unit
42 Storage unit
43 Communication unit
44 Display unit
45 Operation acceptance unit
46 Sound input/output unit
50 Sharing person terminal
51 Control unit
52 Storage unit
53 Communication unit
54 Display unit
55 Operation acceptance unit
56 Sound input/output unit

The invention claimed is:

1. A location information sharing control system comprising:
an object person terminal carried by an object person, the object person terminal including a short-range communication unit that transmits identification information for identifying the object person terminal via the short-range wireless communication;
a detection terminal that is present in a region including a watching area of the object person set in advance, and detects the object person terminal with which communication is possible via short-range wireless communication, the detection terminal including a detection unit that detects the object person terminal with which communication is possible;
a server that registers information transmitted from the object person terminal and the detection terminal, and,
a transmission unit that, when the object person terminal is detected by the detection unit, acquires the identification information transmitted from the short-range communication unit and transmits the identification information to the server,
wherein the server includes:
an acquisition unit that acquires the identification information transmitted from the detection terminal and information on a location of the detection terminal,
a specification unit that specifies a location of the object person terminal based on the identification information and the information on the location of the detection terminal acquired by the acquisition unit,
a management unit that manages information on a location information sharing user who shares information on a location of the object person terminal, and
a sharing unit that shares the information on the location with the location information sharing user set to be able to share the information on the location of the object person terminal in the management unit
wherein the management unit includes:
a manager information management unit that manages information on a manager of the object person who causes the object person to carry the object person terminal to acquire the information on the location of the object person terminal as information on the location information sharing user;
a sharing person information management unit that manages information on a sharing person who is other than the manager and share the information on the location of the object person terminal; and
a setting unit that sets a condition under which the information on the location is able to be shared for each sharing person,
wherein
the setting unit is able to set a time condition regarding time as the condition,
the location information sharing control system further comprising a schedule acquisition unit that acquires an activity schedule of the object person, and
the setting unit sets, as the time condition, a range of time based on an occurrence time of a predetermined event defined in the activity schedule.

2. The location information sharing control system according to claim 1, wherein the management unit is able to accept an instruction for changing the information on the sharing person from the manager, and change the information on the sharing person when the instruction is accepted.

3. The location information sharing control system according to claim 1, wherein the setting unit is able to set a range of time based on a predetermined time as the time condition.

4. The location information sharing control system according to claim 1, wherein the setting unit is able to set a location condition regarding the location of the object person as the condition.

5. The location information sharing control system according to claim 4, wherein the setting unit is able to set a range of location based on a predetermined location as the location condition.

6. The location information sharing control system according to claim 1, wherein the management unit is able to set a state condition regarding a state of the object person as the condition.

7. The location information sharing control system according to claim 1, wherein
the object person terminal further includes a long-range communication unit that acquires location information of the object person terminal based on a signal from a GPS satellite, and transmits the identification information and the location information to the server via long-range wireless communication, a communication distance of which is longer than a communication distance of the short-range wireless communication, and
the specification unit specifies the location of the object person terminal using the identification information and the location information transmitted from the long-range communication unit of the object person terminal.

8. The location information sharing control system according to claim 1, wherein
the detection terminal is installed at a predetermined location included in the watching area,
the transmission unit transmits information for identifying the detection terminal, and
the acquisition unit uses the information for identifying the detection terminal transmitted from the detection terminal, to acquire the information on the location of the detection terminal from a storage unit in which the information for identifying the detection terminal and the location of the detection terminal are stored in advance in association with each other.

9. The location information sharing control system according to claim 1, wherein
the detection terminal is provided in a mobile body moving in a region including the watching area,
the transmission unit acquires the information on the location of the detection terminal based on a signal from a GPS satellite and transmits the information to the server, and
the acquisition unit acquires the information on the location of the detection terminal based on the information transmitted from the detection terminal.

10. A location information sharing control device that is a server applied to a location information sharing control system, the location information sharing control system including: an object person terminal carried by an object person; a detection terminal that is present in a region including a watching area of the object person set in advance, and detects the object person terminal with which communication is possible via short-range wireless communication; and a server that registers information transmitted from the object person terminal or the detection terminal, the location information sharing control device comprising:
a specification unit that acquires identification information for identifying the object person terminal and information on a location of the detection terminal that are transmitted from the detection terminal, or the identification information and the location information of the object person terminal transmitted from the object person terminal, to specify a location of the object person terminal;
a management unit that manages information on a location information sharing user who shares information on the location of the object person terminal; and
a sharing unit that shares the information on the location with the location information sharing user set to be able to share the information on the location of the object person terminal in the management unit, wherein
the management unit includes:
a manager information management unit that manages information on a manager of the object person who causes the object person to carry the object person terminal to acquire the information on the location of the object person terminal as information on the location information sharing user;
a sharing person information management unit that manages information on a sharing person who is other than the manager and share the information on the location of the object person terminal; and
a setting unit that sets a condition under which the information on the location is able to be shared for each sharing person, wherein
the setting unit is able to set a time condition regarding time as the condition,
the location information sharing control device further comprising a schedule acquisition unit that acquires an activity schedule of the object person, and
the setting unit sets, as the time condition, a range of time based on an occurrence time of a predetermined event defined in the activity schedule.

11. A location information sharing control device that is a server applied to a location information sharing control system, the location information sharing control system including: an object person terminal carried by an object person; a detection terminal that is present in a region including a watching area of the object person set in advance, and detects the object person terminal with which communication is possible via short-range wireless communication; and a server that registers information transmitted from the object person terminal or the detection terminal, the location information sharing control device comprising:
a specification unit that acquires identification information for identifying the object person terminal and information on a location of the detection terminal that are transmitted from the detection terminal, or the identification information and the location information of the object person terminal transmitted from the object person terminal, to specify a location of the object person terminal;
a management unit that manages information on a location information sharing user who shares information on the location of the object person terminal; and
a sharing unit that shares the information on the location with the location information sharing user set to be able to share the information on the location of the object person terminal in the management unit,
wherein the management unit includes:
a manager information management unit that manages information on a manager of the object person who causes the object person to carry the object person terminal to acquire the information on the location of the object person terminal as information on the location information sharing user;
a sharing person information management unit that manages information on a sharing person who is other than the manager and share the information on the location of the object person terminal; and
a setting unit that sets a condition under which the information on the location is able to be shared for each sharing person, wherein the setting unit is able to set a time condition regarding time as the condition, the location information sharing control system further comprising an attendance information acquisition unit that acquires attendance information of the object person, and the setting unit sets, as the time condition, a period during which the object person is assumed to be at work in the attendance information.

12. A location information sharing control system comprising:

an object person terminal carried by an object person, the object person terminal including a short-range communication unit that transmits identification information for identifying the object person terminal via the short-range wireless communication;

a detection terminal that is present in a region including a watching area of the object person set in advance, and detects the object person terminal with which communication is possible via short-range wireless communication, the detection terminal including a detection unit that detects the object person terminal with which communication is possible;

a server that registers information transmitted from the object person terminal and the detection terminal; and a transmission unit that, when the object person terminal is detected by the detection unit, acquires the identification information transmitted from the short-range communication unit and transmits the identification information to the server, wherein the server includes:

an acquisition unit that acquires the identification information transmitted from the detection terminal and information on a location of the detection terminal;

a specification unit that specifies a location of the object person terminal based on the identification information and the information on the location of the detection terminal acquired by the acquisition unit;

a management unit that manages information on a location information sharing user who shares information on a location of the object person terminal; and a sharing unit that shares the information on the location with the location information sharing user set to be able to share the information on the location of the object person terminal in the management unit, wherein the management unit includes:

a manager information management unit that manages information on a manager of the object person who causes the object person to carry the object person terminal to acquire the information on the location of the object person terminal as information on the location information sharing user;

a sharing person information management unit that manages information on a sharing person who is other than the manager and share the information on the location of the object person terminal; and a setting unit that sets a condition under which the information on the location is able to be shared for each sharing person, wherein the setting unit is able to set a time condition regarding time as the condition, the location information sharing control system further comprising an attendance information acquisition unit that acquires attendance information of the object person, and the setting unit sets, as the time condition, a period during which the object person is assumed to be at work in the attendance information.

* * * * *